US007554974B2

(12) United States Patent
Palmer et al.

(10) Patent No.: US 7,554,974 B2
(45) Date of Patent: Jun. 30, 2009

(54) SYSTEMS AND METHODS OF PERFORMING STATEFUL SIGNALING TRANSACTIONS IN A DISTRIBUTED PROCESSING ENVIRONMENT

(75) Inventors: Jonathan James Palmer, Durham, NC (US); Mark Allen Erickson, Raleigh, NC (US); Mark Ernest Davidson, Chapel Hill, NC (US); Raghavendra Gopala Rao, Cary, NC (US); Devesh Agarwal, Raleigh, NC (US); Peter Joseph Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 751 days.

(21) Appl. No.: 10/796,653

(22) Filed: Mar. 9, 2004

(65) Prior Publication Data

US 2005/0203994 A1 Sep. 15, 2005

(51) Int. Cl.
*H04L 12/50* (2006.01)
(52) U.S. Cl. ...................................... 370/359; 375/112
(58) Field of Classification Search ................. 370/216, 370/219, 230, 231, 278, 359, 396, 467, 469; 379/207.02, 221.08, 229, 133, 112, 113, 379/134, 289
See application file for complete search history.

(56) References Cited

U.S. PATENT DOCUMENTS

| 5,650,998 | A |   | 7/1997  | Angenot et al. |
| 5,671,225 | A |   | 9/1997  | Hooper et al. |
| 5,838,683 | A |   | 11/1998 | Corley et al. |
| 5,852,660 | A | * | 12/1998 | Lindquist et al. ............ 379/230 |
| 6,002,693 | A |   | 12/1999 | Hahn |
| 6,134,618 | A |   | 10/2000 | Hebert |

(Continued)

FOREIGN PATENT DOCUMENTS

KR    1020030025024 A    3/2003

(Continued)

OTHER PUBLICATIONS

Author: Guy Redmill, Title: An Introduction to SS7, Date: Jul. 2001.*

(Continued)

*Primary Examiner*—Ricky Ngo
*Assistant Examiner*—Wei-Po Kao
(74) *Attorney, Agent, or Firm*—Jenkins, Wilson, Taylor & Hunt, P.A.

(57) ABSTRACT

Methods and systems for performing stateful signaling transactions in a distributed processing environment are disclosed. A method for performing stateful signaling transactions in a distributed processing environment includes receiving a signaling message at a routing node, such as a signal transfer point. The signaling message is distributed to one of the plurality of stateful processing modules. The receiving stateful processing module buffers the signaling message and initiates a stateful transaction based on the signaling message. Initiating the stateful transaction may include generating a query message and inserting a stateful processing module identifier in the query message. The query message is sent to an external node, such as an SCP, which formulates a response. The SCP may insert the stateful processing module in the response and send the response back to the signal transfer point. The signal transfer point decodes the response and uses the stateful processing module identifier to forward the response to the correct stateful processing module.

38 Claims, 15 Drawing Sheets

U.S. PATENT DOCUMENTS

| | | | |
|---|---|---|---|
| 6,182,086 B1 | 1/2001 | Lomet et al. | |
| 6,249,572 B1* | 6/2001 | Brockman et al. | 379/133 |
| 6,327,267 B1 | 12/2001 | Valentine et al. | |
| 6,396,840 B1 | 5/2002 | Rose et al. | |
| 6,434,135 B1 | 8/2002 | Jones et al. | |
| 6,611,584 B1* | 8/2003 | Khello et al. | 379/201.03 |
| 6,625,273 B1* | 9/2003 | Ashdown et al. | 379/221.13 |
| 6,731,741 B1 | 5/2004 | Fourcand et al. | |
| 6,779,030 B1 | 8/2004 | Dugan et al. | |
| 6,785,374 B2 | 8/2004 | Wang et al. | |
| 6,795,546 B2 | 9/2004 | Delaney et al. | |
| 6,944,666 B2 | 9/2005 | Belkin | |
| 6,959,076 B2 | 10/2005 | Chang et al. | |
| 2001/0046285 A1* | 11/2001 | Park | 379/207.02 |
| 2001/0053218 A1* | 12/2001 | Leung et al. | 379/221.08 |
| 2002/0048360 A1 | 4/2002 | Zambre et al. | |
| 2002/0054674 A1 | 5/2002 | Chang et al. | |
| 2002/0059411 A1 | 5/2002 | Barnhouse et al. | |
| 2002/0178262 A1 | 11/2002 | Bonnell et al. | |
| 2003/0037108 A1 | 2/2003 | Peiffer et al. | |
| 2003/0231652 A1* | 12/2003 | Sprague et al. | 370/467 |
| 2003/0235285 A1 | 12/2003 | Marsico | |
| 2004/0024894 A1 | 2/2004 | Osman et al. | |
| 2004/0264671 A1 | 12/2004 | Lamberton et al. | |
| 2005/0094623 A1* | 5/2005 | D'Eletto | 370/352 |
| 2005/0203994 A1 | 9/2005 | Palmer et al. | |
| 2006/0209791 A1 | 9/2006 | Khadri et al. | |
| 2007/0168421 A1 | 7/2007 | Kalyanpur et al. | |
| 2008/0181382 A1 | 7/2008 | Lean et al. | |
| 2008/0260119 A1 | 10/2008 | Marathe et al. | |
| 2008/0285438 A1 | 11/2008 | Marathe et al. | |

FOREIGN PATENT DOCUMENTS

| | | | |
|---|---|---|---|
| WO | 02/07456 A1 | 1/2002 | |

OTHER PUBLICATIONS

International Search Report and Written Opinion of the International Searching Authority corresponding to PCT application No. PCT/US05/07712 dated Jul. 25, 2006.

Office Action for U.S. Appl. No. 11/085,620 (Dec. 19, 2008).

Communication of European Publication No. and Information on the Application of Article 67(3) EPC for European Application No. 07 709 644.4 (Sep. 3, 2008).

Notification of Transmittal of the International Search Report and the Written Opinion of the International Searching Authority, or the Declaration for International Application No. PCT/US2008/005175 (Aug. 12, 2008).

Communication pursuant to Article 94(3) EPC for European Application No. 03 796 406.1 (Jun. 19, 2008).

Notification of Transmittal of the International Search Report and the Written Opinion of the International Searching Authority, or the Declaration for International Application No. PCT/US08/01285 (Jun. 2, 2008).

Notification of European Publication No. and Information on the Application of Article 67(3) EPC for European Application No. 06 739 166.4 (Nov. 21, 2007).

Notification of Transmittal of the International Search Report and the Written Opinion of the International Searching Authority, or the Declaration for International Application No. PCT/US06/10263 (Sep. 25, 2007).

Notification of Transmittal of the International Search Report and the Written Opinion of the International Searching Authority, or the Declaration for International Application No. PCT/US07/00492 (Oct. 19, 2007).

Communication pursuant to Article 96(2) EPC for European Application No. 03 796 406.1 (Sep. 28, 2006).

Supplementary European Search Report for European Application No. 03 796 406.1 (May 10, 2006).

Notification of European Publication No. and Information on the Application of Article 67(3) EPC for European Application No. 03 796 406.1 (Jul. 20, 2005).

Notification of Transmittal of the International Search Report or the Declaration for International Application No. PCT/US03/36520 (Jul. 6, 2004).

Notice of Allowance and Fee(s) Due for U.S. Appl. No. 10/294,400 (Apr. 28, 2004).

"Integrated Services Digital Network (ISDN); Signalling System No. 7 (SS7); ISDN User Part (ISUP) Version 4 for the International Interface; Part 1: Basic Servies," European Telecommunications Standards Institute, ETSI EN 300 356-1, V4.2.1, pp. 1-44 (May 2001).

"Integrated Services Digital Network (ISDN); Signalling System No. 7; Signalling Connection Control Part (SCCP) (connectionless and connection-oriented) to Support International Interconnection; Part 1: Protocol Specification," European Telecommunications Standards Institute, ETSI EN 300 009-1, V1.4.2, pp. 1-18 (Nov. 1999).

Liao et al., "SS7-TCAP/IP Interworking," Internet Engineering Task Force, pp. 1-14 (Mar. 1999).

* cited by examiner

SYSTEMS AND METHODS OF PERFORMING STATEFUL SIGNALING TRANSACTIONS IN A DISTRIBUTED PROCESSING ENVIRONMENT

TECHNICAL FIELD

The present invention relates to methods and systems for performing stateful signaling transactions. More particularly, the present invention relates to methods and systems for performing stateful signaling transactions in a distributed processing environment.

BACKGROUND ART

In telecommunications signaling networks, signaling message routing nodes often include distributed processing architectures. For example, signaling system 7 (SS7) signal transfer points (STPs) and SS7-over-Internet protocol (IP) gateways often include distributed processing architectures. Such architectures may include groups of circuit boards, each having one or more microprocessors, that perform stateless message processing functions, such as message routing. Dividing the processing to perform signaling message routing among multiple processors increases reliability over centralized routing architectures.

In addition to message routing, STPs have been used to perform other stateless message processing functions, such as global title translation (GTT). Global title translation is the process by which a called party address in the SCCP portion of a signaling message is translated into a destination point code and subsystem number. Like signaling message routing, global title translation has also been distributed among multiple processors in signaling message routing nodes, such as signal transfer points.

FIG. 1 is a block diagram of an STP 100 with distributed routing and GTT processing. In FIG. 1, STP 100 includes an inter-processor message transport bus 102, a pair of maintenance and administration subsystem processors 104, a first SS7 link interface module (LIM) 106, a second LIM 108, a first SCCP module 110, and a second SCCP module 112. Maintenance and administration subsystem processors 104 perform maintenance operations, such as alarm monitoring and database provisioning. Link interface modules 106 and 108 perform signaling message routing functions. SCCP modules 110 and 112 perform SCCP functions, such as global title translation.

In one implementation, SCCP modules 110 and 112 may be identically provisioned so as to be operated in a load-sharing manner. That is, an inbound or receiving LIM may internally distribute received SCCP messages to an SCCP module using a load sharing algorithm. The load sharing algorithm may distribute messages among available SCCP cards in any suitable manner, such as a round-robin manner.

Load-sharing among multiple redundant processors is advantageous when processing messages that are not associated with stateful or sequenced transactions. For example, GTT processing of class 0 SCCP messages requires only that the global title address in a received SCCP message be translated and that the message be routed to a final destination based on the translated address. Once the SCCP module performs an address translation and directs the SCCP message to an outbound LIM, that particular address translation is of no significance to translation operations performed on SCCP messages subsequently received by the STP. Hence, GTT processing of class 0 SCCP messages is not considered to be stateful in nature, and a load-sharing algorithm may be employed to handle internal SCCP message distribution within a multi-processor STP.

In some instances, it may be desirable to perform stateful transactions at an STP. For example, it may be desirable to implement stateful transactions on redundant processing modules, such as SCCP modules 120 and 122 illustrated in FIG. 1. Such stateful transactions may include related messages that are received or transmitted by the signal transfer point at different times. One problem with implementing stateful transactions in a distributed processing environment is that load sharing algorithms will not always guarantee that subsequent signaling messages in a stateful transaction are processed by the same processing module as the signaling messages that initiated the stateful transaction. Load sharing algorithms simply distribute messages based on processor availability, without regard to which processor may have initiated a stateful transaction.

One potential solution to such a problem is to process all SCCP messages, including messages associated with stateful and stateless transactions, at the same processing module. While such a solution would ensure the proper distribution of messages for stateful transactions, the reliability of such a system is decreased over systems with distributed SCCP processing.

Accordingly, there exists a long felt need for improved methods and systems for processing messages associated with stateful transactions in a distributed processing environment.

DISCLOSURE OF THE INVENTION

According to one aspect, the present invention includes a network routing node, such as a signaling system 7 signal transfer point, which includes multiple stateful processing modules for processing signaling messages for performing stateful and stateless signaling transactions. Trigger messages for stateful transactions may be forwarded to stateful processing modules within the STP using a load sharing algorithm. In response to receiving a stateful transaction trigger message, a stateful processing module may buffer the trigger message and formulate a stateful transaction query message. The stateful processing module may insert a processing module identifier in the stateful transaction query message. The stateful processing module may forward the stateful transaction query message to a destination. The destination may formulate a response to the stateful transaction query message and include the stateful processing module identifier in the response message. The signal transfer point may receive the response message and use the stateful processing module identifier in the response message to distribute the response message to the stateful processing module that originated the stateful transaction query message. Thus, stateful transaction trigger messages may be load shared among processing modules, while response messages are distributed to the correct processing modules using processing module identifiers.

Using processing module identifiers to distribute messages enables rapid and accurate location of the processing module that originates a stateful transaction. In addition, combining load sharing with stateful transaction processing provides increased versatility over conventional STPs that performed only stateless processing, such as GTT.

One type of stateful transaction that it may be desirable to implement in an STP is a TCAP transaction. Normally, a TCAP transaction is originated by an end office based on a trigger condition detected by the end office. In response to the trigger condition, the end office formulates a query message and addresses the query message to an SCP. The end office then forwards the query message to the SCP. The SCP receives the query message, performs a database lookup, and sends a response back to the end office. The conventional stateless operation of the STP is to route the query message to the SCP and route the response message back to the end office without storing any state information regarding to the TCAP transaction.

According to one aspect of the present invention, the STP may buffer the original TCAP query message and formulate a new query message for the SCP or other database. The STP may receive the response message from the SCP and formulate a new response back to the querying end office. In order to complete the transaction, the STP must match the STP-originated query with a response from the SCP.

Because the STP load shares each end-office-originated query message among multiple stateful processing modules, stateful processing is efficiently and reliably performed by the STP. In addition, because the STP inserts a stateful processing module identifier in STP-originated query messages in a manner that will cause the recipient to include the stateful processing module identifier in the corresponding response message, the STP ensures correct distribution of stateful transaction response messages.

The present invention may be described herein as functions, modules, or processes. It is understood that these functions, modules, or processes may be implemented in hardware, software, firmware, or any combination thereof. In addition, the present invention may be implemented as a computer program product comprising computer executable instructions embodied in a computer-readable medium. Exemplary computer readable media in which a computer program product of the invention may be implemented include semiconductor memory devices, optical and magnetic disk storage devices, or any other suitable device capable of storing instructions to be executed by a processor.

Accordingly, it is an object of the invention to provide methods and systems for performing stateful transactions in a signal transfer point.

It is another object of the invention to provide methods and systems for performing stateful transactions and load sharing in a distributed processing environment.

It is yet another object of the invention to provide methods and systems for triggering stateful transactions based on a plurality of different types of signaling messages.

Some of the objects of the invention having been stated hereinabove, other objects will be evident as the description proceeds, when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
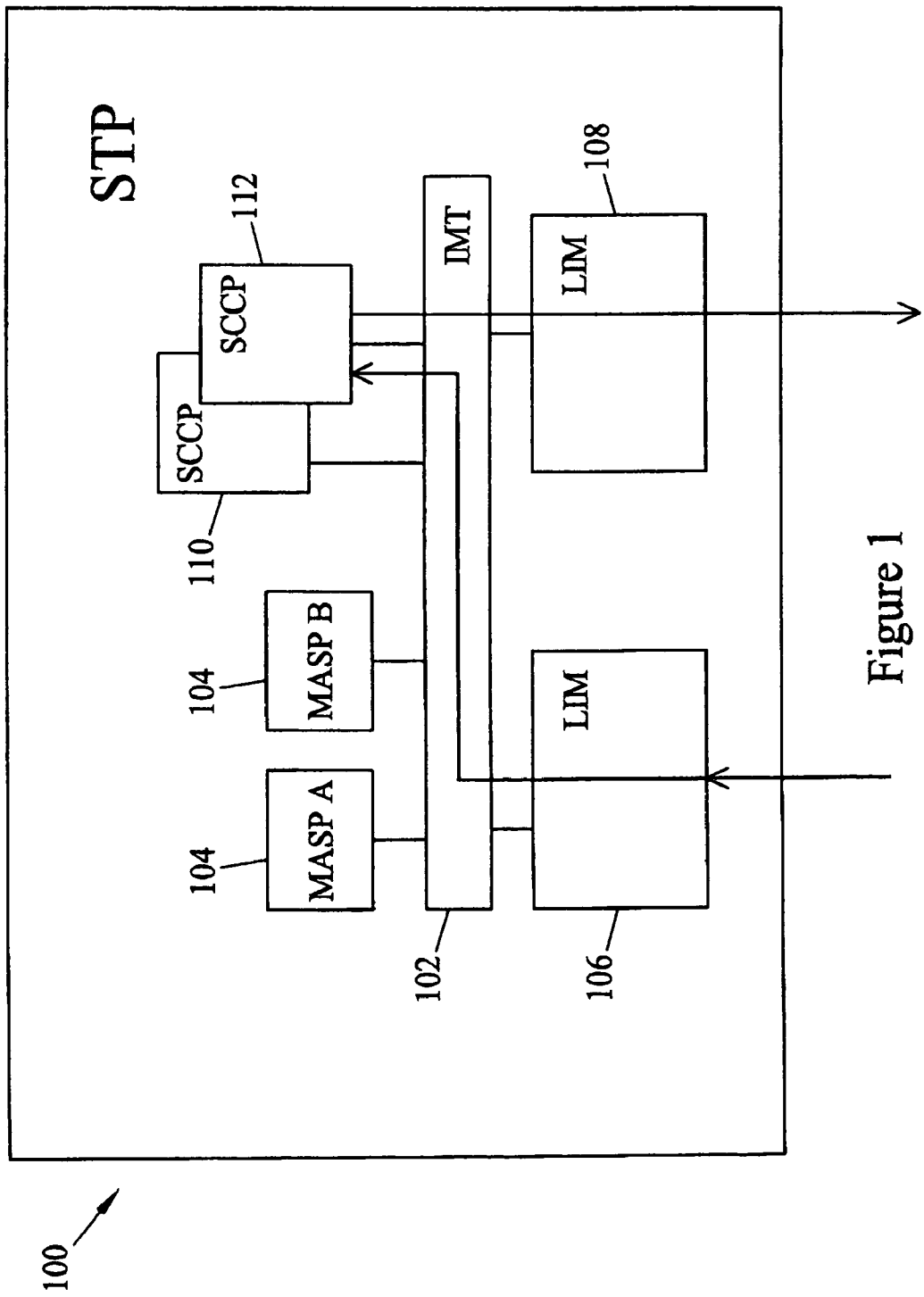
FIG. 1 is a block diagram of a conventional signal transfer point for performing stateless processing, such as global title translation and routing.
Figure 2:
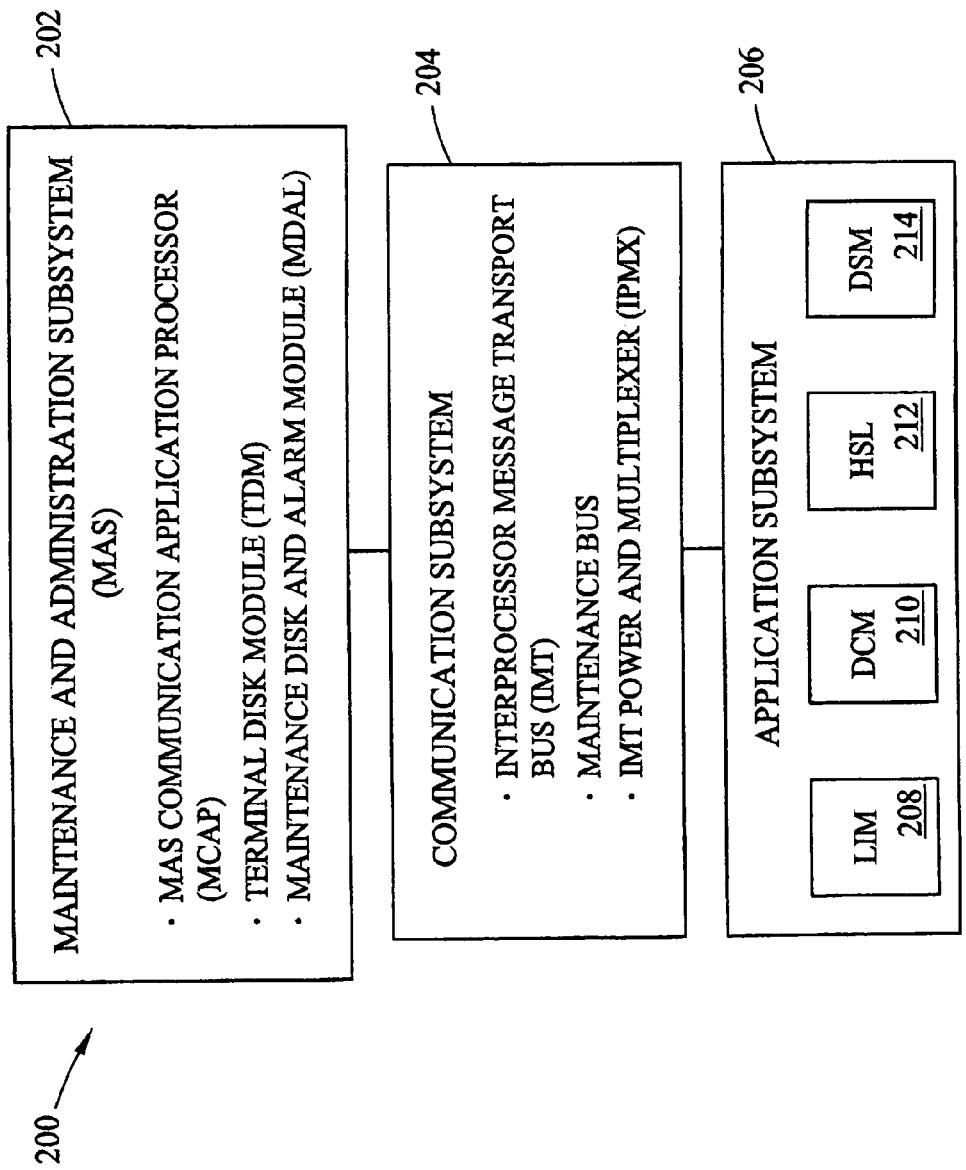
FIG. 2 is a is a block diagram that illustrates an exemplary internal architecture of an STP suitable for use with embodiments of the present invention.

According to one embodiment, the present invention includes a communications network routing node, such as an STP configured to perform stateful signaling transactions and load sharing. FIG. 2 is a block diagram illustrating an exemplary STP 200 suitable for use with embodiments of the present invention. Referring to FIG. 2, STP 200 includes the following subsystems: a maintenance and administration subsystem (MAS) 202, a communication subsystem 204 and an application subsystem 206. MAS 202 provides maintenance communications, initial program loading, peripheral services, alarm processing and system disks. Communication subsystem 204 includes an interprocessor message transport (IMT) bus that is the main communication bus among all subsystems in STP 200. The IMT bus may include 1 Gbps counter-rotating serial rings.

Application subsystem 206 includes application cards or printed circuit boards capable of communicating with the other cards through the IMT bus. Numerous types of application cards can be included in STP 200. Exemplary application cards include a link interface module 208 that provides SS7 links and X.25 links, a data communications module (DCM) 210 that provides an Internet protocol (IP) signaling interface to external nodes, and a high-speed asynchronous transfer mode (ATM) communications link module (HSL) 212. A database services module (DSM) 214 may be configured to perform SCCP processing, such as global title translation.

Figure 3:
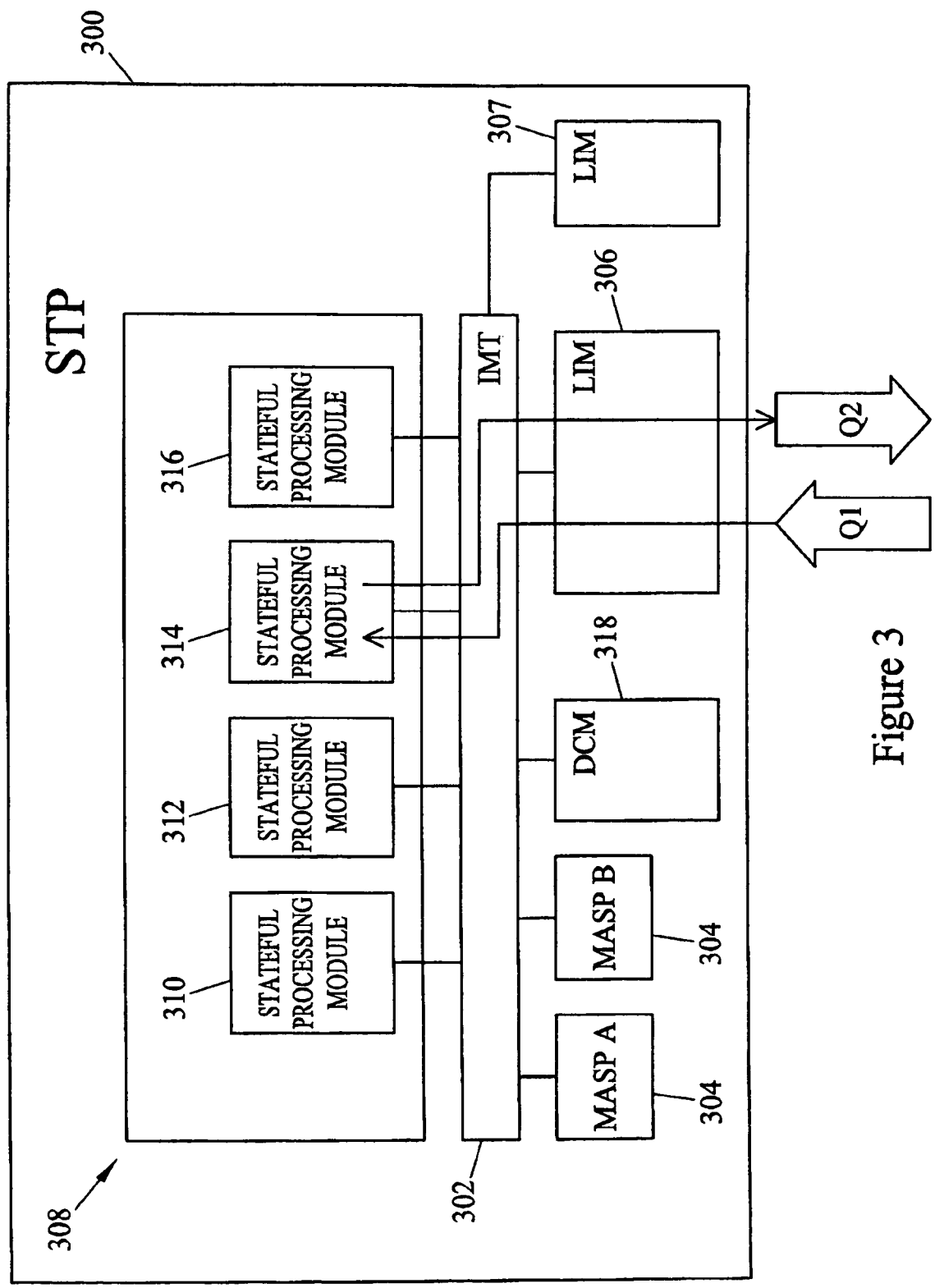
FIG. 3 is a block diagram illustrating an exemplary internal architecture of an STP including stateful transaction processing and load sharing capabilities according to an embodiment of the present invention.

Internal Architecture for STP with Stateful
Transaction Processing Functionality FIG. 3 illustrates an exemplary internal architecture of an STP including stateful transaction processing and load sharing functionality according to an embodiment of the present invention. In FIG. 3, STP 300 includes a high-speed IMT bus 302. A number of distributed processing modules or cards are coupled to IMT bus 302. These modules include a pair of maintenance and administration subsystem processors 304, SS7-capable link interface modules 306 and 307, an application subsystem 308 that includes four stateful processing modules 310, 312, 314, and 316, and a DCM 318. These modules are physically connected to IMT bus 302 such that signaling and other types of messages may be routed internally between all active cards or modules. In one embodiment, stateful processing modules 310, 312, 314, and 316 may be implemented as cards plugged into slots connected by IMT bus 302. One example of a commercially-available hardware platform suitable for implementing stateful processing modules 310, 312, 314, and 316 is the DSM card available from Tekelec of Calabasas, Calif. Each DSM may include a communications processor for communicating with other modules via bus 302 and an application processor for performing stateful and stateless message processing, as will be described in detail below.

The present invention is not limited to implementing stateful message processing in an STP using DSM cards. In an alternate embodiment of the present invention, stateful processing modules 310, 312, 314, and 316 may be implemented using external computing platforms, such as TekServer™ platforms available from Tekelec of Calabasas, Calif. Such TekServer™ platforms may be coupled IMT bus 302 via interface modules, such as Ethernet modules.

The distributed processing architecture of STP 300 enables multiple LIM, DSM, TekServer™ and other processing modules to be simultaneously coupled to IMT bus 302. Furthermore, although a single group 308 of stateful processing modules is illustrated in FIG. 3, STP 300 may include multiple groups of stateful and/or stateless processing modules without departing from the scope of the invention. For example, STP 300 may include a group of LNP processing modules and a group of GTT processing modules in addition to stateful processing modules 308. In the embodiment illustrated in FIG. 3, it is assumed that each stateful processing module 308 is configured to perform at least one stateful processing function and may also perform a stateless processing function, such as GTT. An exemplary internal architecture for stateful processing modules 308 will be described in detail below.

LIM Architecture and Operation

Figure 4:
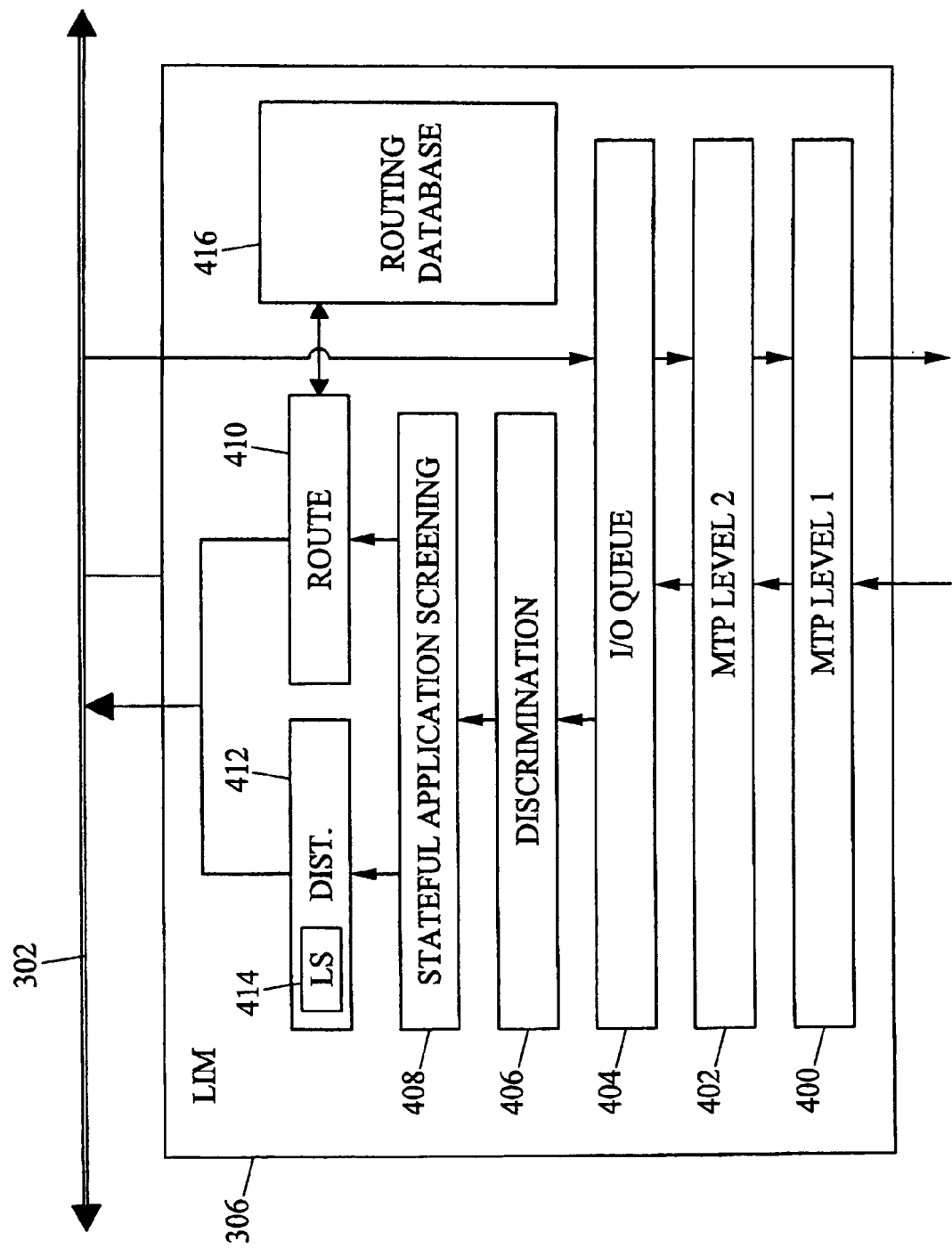
FIG. 4 is a block diagram illustrating a signaling system 7 link interface module (LIM) associated with the STP illustrated in FIG. 3.

In one exemplary architecture, stateful application screening may be performed on link interface modules, such as link interface modules 306 and 307. FIG. 4 is a block diagram of a link interface module with stateful application screening functionality according to an embodiment of the present invention. As illustrated in FIG. 4, LIM 306 includes an MTP level 1 function 400, an MTP level 2 function 402, an I/O buffer or queue 404, an SS7 MTP level 3 message discrimination function 406, a stateful application screening function 408, a message routing function 410, a message distribution function 412, a load sharing function 414 and a routing database 416. MTP level 1 function 400 is configured to send and receive digital data over a particular physical interface. MTP level 2 function 402 provides error detection, error correction, and sequenced delivery of SS7 message packets. I/O queue 404 provides temporary buffering of incoming and outgoing signaling message packets.

Discrimination function 406 receives incoming signaling messages from the lower processing layers and determines whether the messages are addressed to STP 300 and, consequently, whether the messages require processing by one or more subsystems in STP 300. Stateful application screening function 408 examines incoming signaling messages and determines whether the messages are response messages associated with existing stateful transactions initiated by STP 300. For example, with respect to SS7 TCAP messages, a destination point code (DPC) parameter, a service indicator (SI) parameter, an SCCP called party (CdPA) parameter, and a TCAP package type identifier contained within each received TCAP message may be examined and used by functions 406 and 408 to determine if a message is a response message associated with a stateful transaction that is being executed by STP 300.

Figure 5:
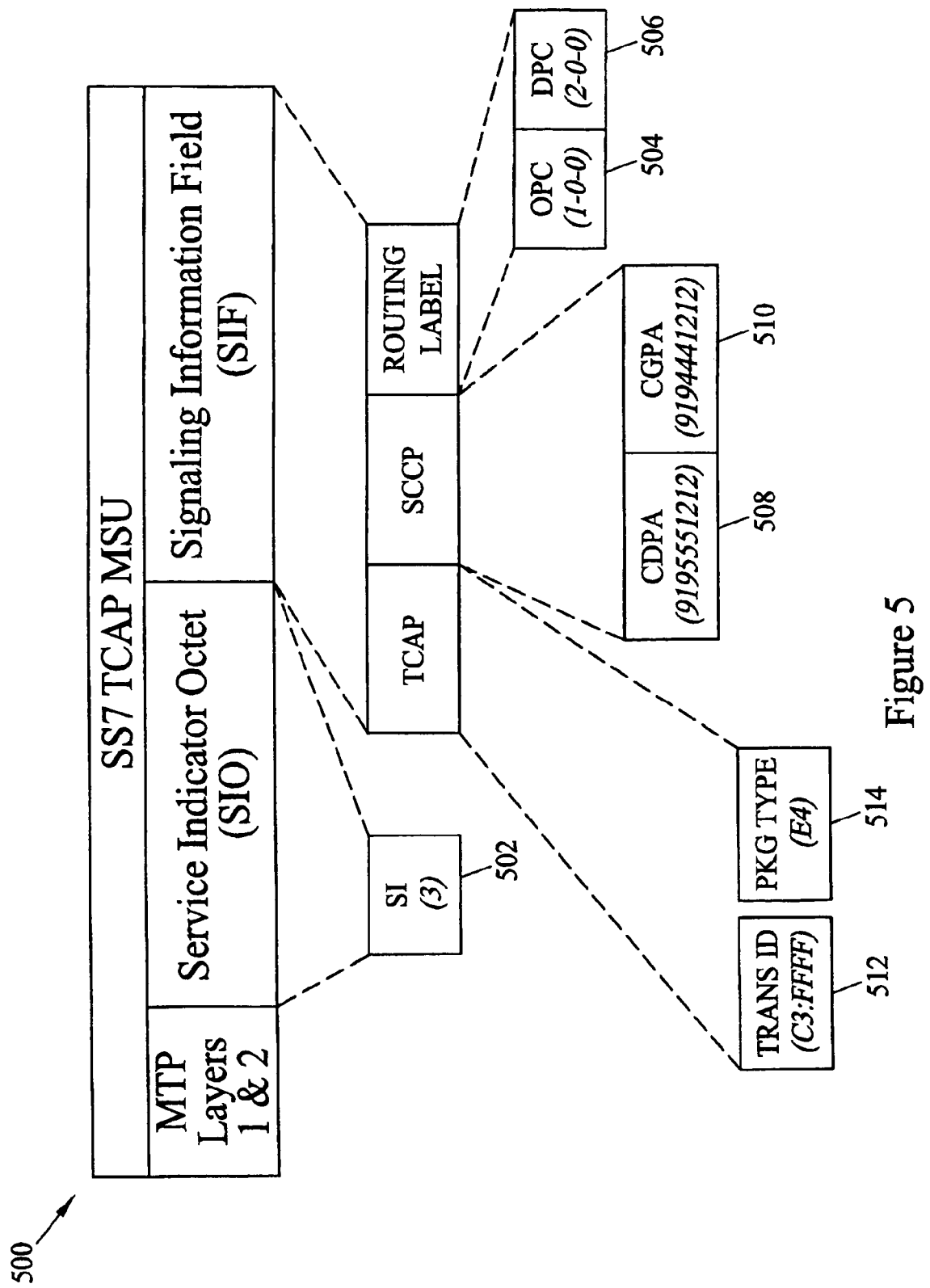
FIG. 5 is a block diagram illustrating the structure of an exemplary SS7 transaction capabilities application part (TCAP) signaling message.

FIG. 5 illustrates exemplary parameters in a TCAP message that may be used by functions 406 and 408 to identify TCAP responses for stateful transaction initiated by STP 300. In FIG. 5, SS7 TCAP MSU 500 includes an SI field 502, an OPC field 504, a DPC field 506, a SCCP CdPA field 508, an SCCP calling party (CgPA) field 510, a TCAP transaction ID field 512, and a TCAP package type identifier field 514. In order to identify TCAP reply messages for stateful transactions initiated by STP 300, discrimination function 406 may be configured to identify received SS7 messages that include a DPC parameter value associated with STP 300, an SI parameter value of 3 (i.e., SCCP messages), a CdPA value(s) associated with STP 300 (i.e., a self-ID associated with STP 300). Stateful application screening function 408 may also be configured to identify received SS7 messages that are TCAP response messages by checking the TCAP package type parameter 514 for a predetermined hexadecimal value. In the illustrated example, the hexadecimal value for STP-originated TCAP transactions is 0xE4.

If a received message is identified as a stateful transaction response message, stateful application screening function 408 may associate a tag or marker (e.g., a binary flag) with the message that identifies the message as a stateful transaction response message. This tag or marker may later be used by the originating stateful processing module to identify and process the response message. In one embodiment, stateful application screening function 408 may also examine a stateful processing module identifier that is associated with or stored within a received response message. For example, with respect to SS7 TCAP messages, stateful processing module identification information may be encoded in TCAP transaction ID field 512. The stateful processing module identifier is then used by message handling and distribution function 412 to distribute the received TCAP response message to the stateful processing module that is controlling the stateful transaction with which the response message is associated. Stateful application screening function 408 and discrimination function 406 may be combined and implemented as a single functional entity without departing from the scope of the invention.

The present invention is not limited to performing stateful TCAP transactions or distributing TCAP response messages to the proper processing module in a distributed processing environment. The methods and systems described herein may be used to perform similar stateful processing operations for any suitable telephony signaling protocols, including IP telephony signaling protocols. One such IP telephony signaling protocol is the session initiation protocol (SIP). In order to perform stateful processing in a distributed processing environment for SIP messages, target stateful processing module identification information may be similarly encoded within SIP query and response messages. For example, such stateful processing module identification information may be stored in a CSEQ field, a CALL-ID field, or any other appropriate field that is present in the SIP response message. In a manner similar to that described above with respect to SS7 TCAP signaling messages, this processing module identification information may be included in response messages and may be used to distribute each response message to the processing module controlling the stateful transaction with which the message is associated.

Discrimination, stateful transaction screening, and message distribution functions similar to those described above may be incorporated on a SIP-enabled communication module, such as DCM 318. DCM 318 may receive and internally distribute SIP messages in a manner similar to that described above with respect to LIM 306. The SIP protocol is described in Handley et al., *SIP: Session Initiation Protocol*, Internet Engineering Task Force (IETF) Request for Comments (RFC) 2543, March, 1999, the disclosure of which is incorporated herein by reference in its entirety.

Figure 6:
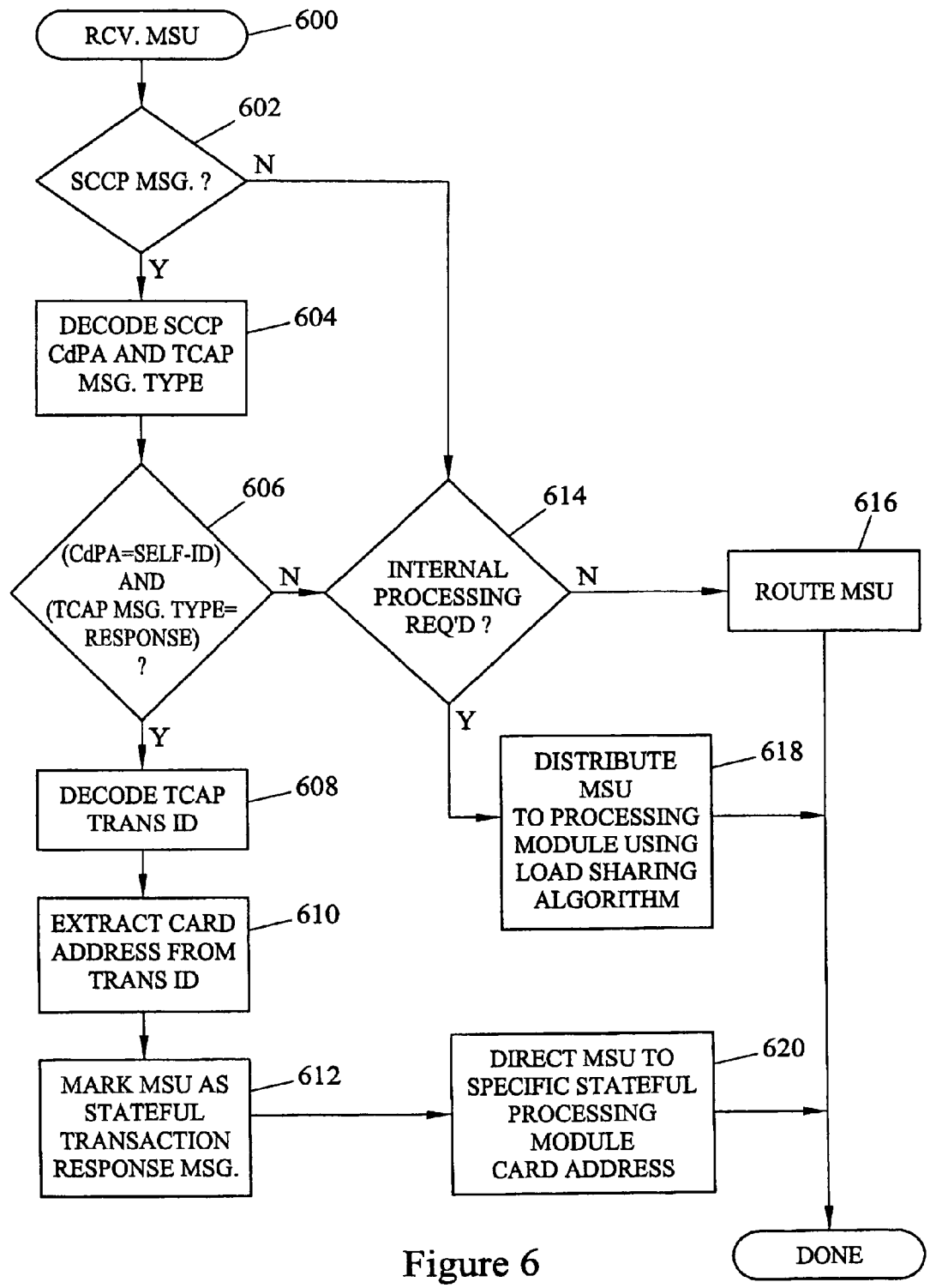
FIG. 6 is a flow chart illustrating exemplary processing steps performed by a link interface module in directing messages associated with stateful transactions to the correct stateful processing modules in an embodiment of the invention in which stateful processing module identification is performed by a LIM.

FIG. 6 is a flow chart illustrating exemplary steps performed by LIM 306 in identifying and distributing messages associated with stateful transactions according to an embodiment of the present invention. Referring to FIG. 6, in step 600, an SS7 MSU is received at LIM 306. In step 602, LIM 306 examines the message and determines whether the message is an SCCP message (i.e., SI=3). If the message is determined to be an SCCP message, the SCCP CdPA and TCAP message type parameters are decoded (step 604). The CdPA and message type parameters are examined (step 606). If it is determined that the value stored in the CdPA parameter is a self-ID associated with STP 300 and that the TCAP message type is a response message, then a TCAP transaction ID parameter is decoded (step 608). A processing module identifier or address is extracted from the decoded TCAP transaction ID parameter in step 610, and the MSU is tagged or marked as a stateful transaction response message (step 612). The MSU is then forwarded to the processing module identified using the processing module identifier (step 614).

Returning to step 602, if the message is not an SCCP message, control proceeds to step 614 where a check is performed to determine if processing by an internal application is required. Similarly, in step 616, if an SCCP message is determined to contain a CdPA parameter value that is not equal to a self-ID of STP 300 or is determined to contain a TCAP message that is not a response message, then control proceeds to step 614 where a check is performed to determine if processing by an internal application is required. If no internal application processing is indicated, then the message is simply routed or through-switched (step 618). If processing by an internal application is indicated, then the message is distributed to a processing module that supports the required service using a load sharing algorithm (step 618). Using load sharing to distribute stateful transaction trigger messages and other messages increases the reliability and throughput of the STP over STPs with centralized processing architectures.

The present invention is not limited to performing stateful processing operations at an STP for received SS7 messages. The stateful transaction processing steps illustrated in FIG. 6 may be used to distribute messages of any telephony signaling protocol, such as SS7 over IP, SIP, H.225, etc., in addition to the SS7 protocol examples described herein.

Stateful Processing Module Architecture and Operation

Figure 7:
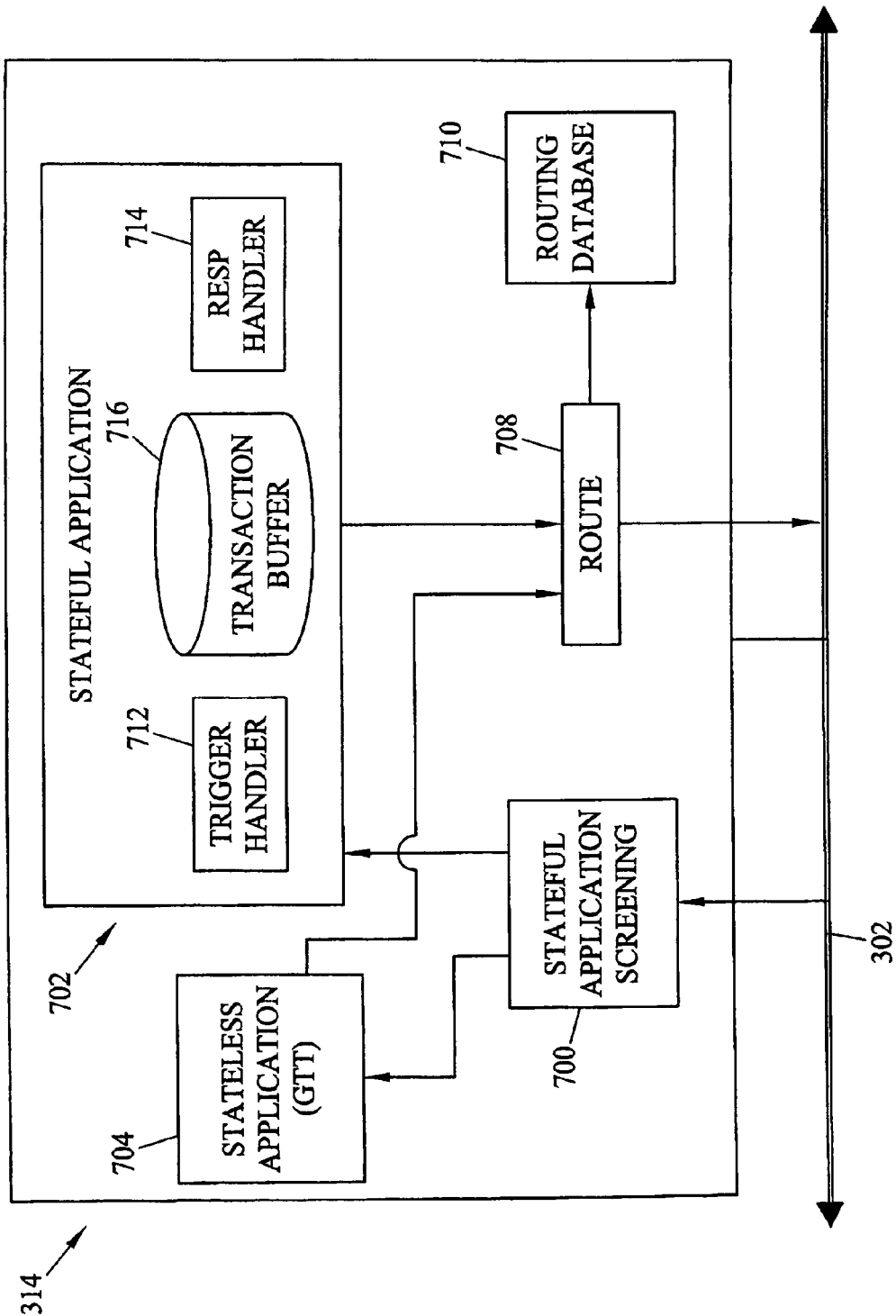
FIG. 7 is a block diagram illustrating a stateful processing module associated with the STP illustrated in FIG. 3.

FIG. 7 is a block diagram illustrating an exemplary internal architecture for stateful processing module 314 illustrated in FIG. 3. In FIG. 7, stateful processing module 314 is coupled to internal communication bus or network 302 and includes a stateful application message screening function 700, a stateful application 702, a stateless application 704, a routing function 708, and a routing database 710. Stateful application screening function 700 receives signaling messages that are distributed by communication modules within the system, such as LIMs 306 and 307 and DCM 318. Stateful application screening function 700 examines received signaling messages to determine whether processing by stateless application 704 or stateful application 702 is required. If processing by stateless application 704 is required, stateful application screening function 700 may direct the message to stateless application 704. Stateless application 704 may be a stateless SCCP application, such as a global title translation application. Once stateless application 704 processes a message requiring stateless processing, stateless application 704 forwards the message to routing function 708. Routing function 708 forwards the message to the interface module associated with the outbound signaling link.

If stateful application screening function 700 determines that a received signaling message requires stateful processing, stateful application screening function 700 directs the message to stateful application 702. Stateful application 702 performs one or more stateful processing functions based on the received signaling messages. In one example, stateful application 702 buffers received stateful transaction trigger messages and formulates stateful transaction query messages based on the trigger messages. Routing function 708 routes the query messages based on destination point codes extracted from the query messages using routing data stored in routing database 710.

In addition to identifying stateful transaction trigger messages, stateful application screening function 700 may also identify response messages associated with existing stateful transactions. In order to identify such response messages, stateful application screening function 700 may examine a received signaling message for a response message tag or marker, which was associated with the message by a communication module (e.g., a LIM, a DCM, a HSL, etc.), as described above. If the message does not include a tag or marker, then the message is not a response message, and the message is directed to a trigger handler 712. If the message includes a tag or marker indicating that the received message is a response message, the message is directed to a response handler 714 for further processing.

Trigger handler 712 may receive signaling messages that trigger stateful transactions, referred to herein as stateful transaction trigger messages. For example, a received ISDN user part (ISUP) signaling message may be encapsulated in an SCCP packet and directed to trigger handler function 712. The ISUP message may initiate a stateful transaction that includes the generation of a TCAP query message. In another example, a TCAP query message may be used by trigger handler 712 to trigger a new TCAP transaction. In a public switched telephone network (PSTN)-to-SIP gateway environment, a received SIP call setup message may initiate a TCAP query/response signaling transaction. In any event, trigger handler 712 may store transaction state information in a transaction buffer database 716. Transaction state information may include some or all of the contents of the initiating or triggering message.

Stateful Transaction Trigger Message Processing and Stateful Transaction Query Message Initiation In response to receiving a stateful transaction trigger message, trigger handler 712 may generate a query message associated with the particular service required by the transaction. For example, trigger handler 712 may receive an ISUP initial address message (IAM) that requires number portability processing (e.g., message Q1 shown in FIG. 3) and may generate an associated TCAP number portability query (e.g., message Q2 shown in FIG. 3). The TCAP query may be routed from STP 200 to an external number portability SCP node in an SS7 network, or alternatively, the TCAP query may be distributed to a number portability database within STP 300. Trigger handler 712 may also insert into the TCAP query message an identifier associated with the stateful processing module that controls or initiates the stateful transaction. The stateful processing module identifier may be a logical identifier or a physical identifier, such as a bus or card address. With respect to SS7 TCAP query and response messages, the stateful processing module identifier may be encoded in TCAP transaction ID field 512, as described above with respect to FIG. 5. The stateful processing module identifier stored in the TCAP query message may be included in the associated TCAP response message returned by the servicing SCP. The processing module identifier may be used to ensure that the TCAP response message is returned to the controlling stateful application processing module.

In addition to inserting stateful processing module identification information in a TCAP query message, trigger handler 712 may also insert transaction data information location information in the query message. The transaction data location may be inserted in the query message in a manner such that the same location information is returned in an associated response message. For example, with respect to TCAP query and response messages, the location information may be stored in a TCAP transaction ID field along with the stateful processing module identification information. The transaction data location information may be stored in two bytes of the TCAP transaction ID field, while the processing module identification information stored in a third byte of the transaction ID field. Examples of such transaction data location information include a database identifier, a table identifier, an array identifier, a record number identifier, an index pointer, a binary tree node identifier, a memory address, a memory address offset, etc. Once again, the transaction data location information may be used by a stateful transaction processing system of the present invention to quickly locate and access information associated With a particular stateful transaction that is being processed by the stateful processing module.

Stateful Transaction Response Message Processing

Figure 8:
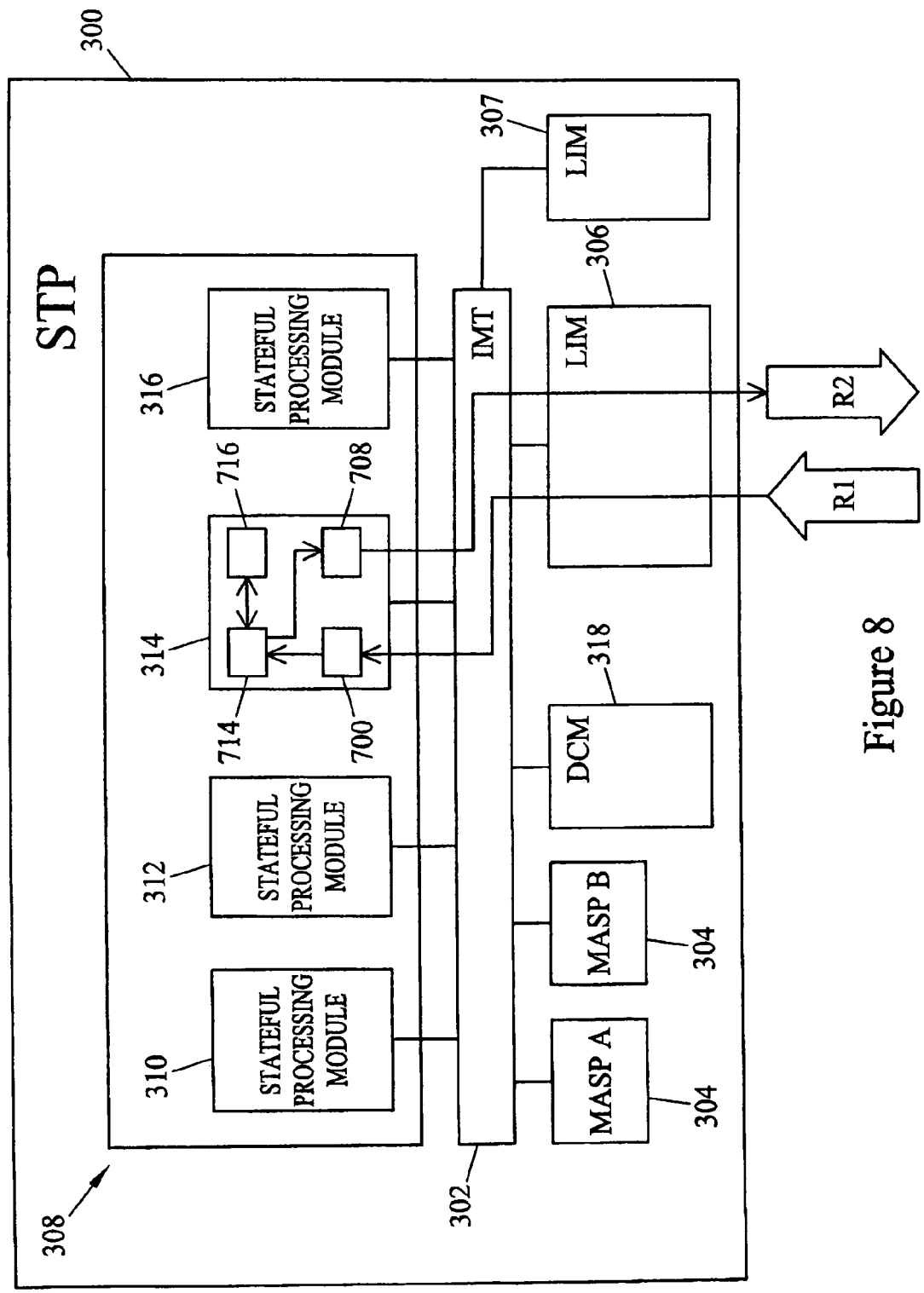
FIG. 8 is a block diagram of the STP illustrated in FIG. 3 including a message flow for a TCAP response message through the STP.

FIG. 8 illustrates an exemplary message flow through STP 300 for a TCAP response message generated in response to an STP-originated TCAP query. Referring to FIG. 8, response message R1 is received by LIM 306 and identified as being part of a stateful transaction. LIM 306 may utilize the stateful processing module identifier in the signaling message to distribute the response message to stateful processing module 314. LIM 306 may also insert a tag in the response message that identifies the message as a response.

Once the message arrives at stateful processing module 314, stateful application screening function 700 may forward the message to response handler 714. Response handler 714 may use the stateful transaction data location information stored in the message to locate the data for the transaction in database 716. Once the data is located, response handler 714 may formulate a TCAP response and forward the response to routing function 708. Routing function 708 may route the response to the link interface module associated with the appropriate outbound signaling link. In the illustrated example, message R2 indicates the response that is sent over the outbound signaling link.

Figure 9:
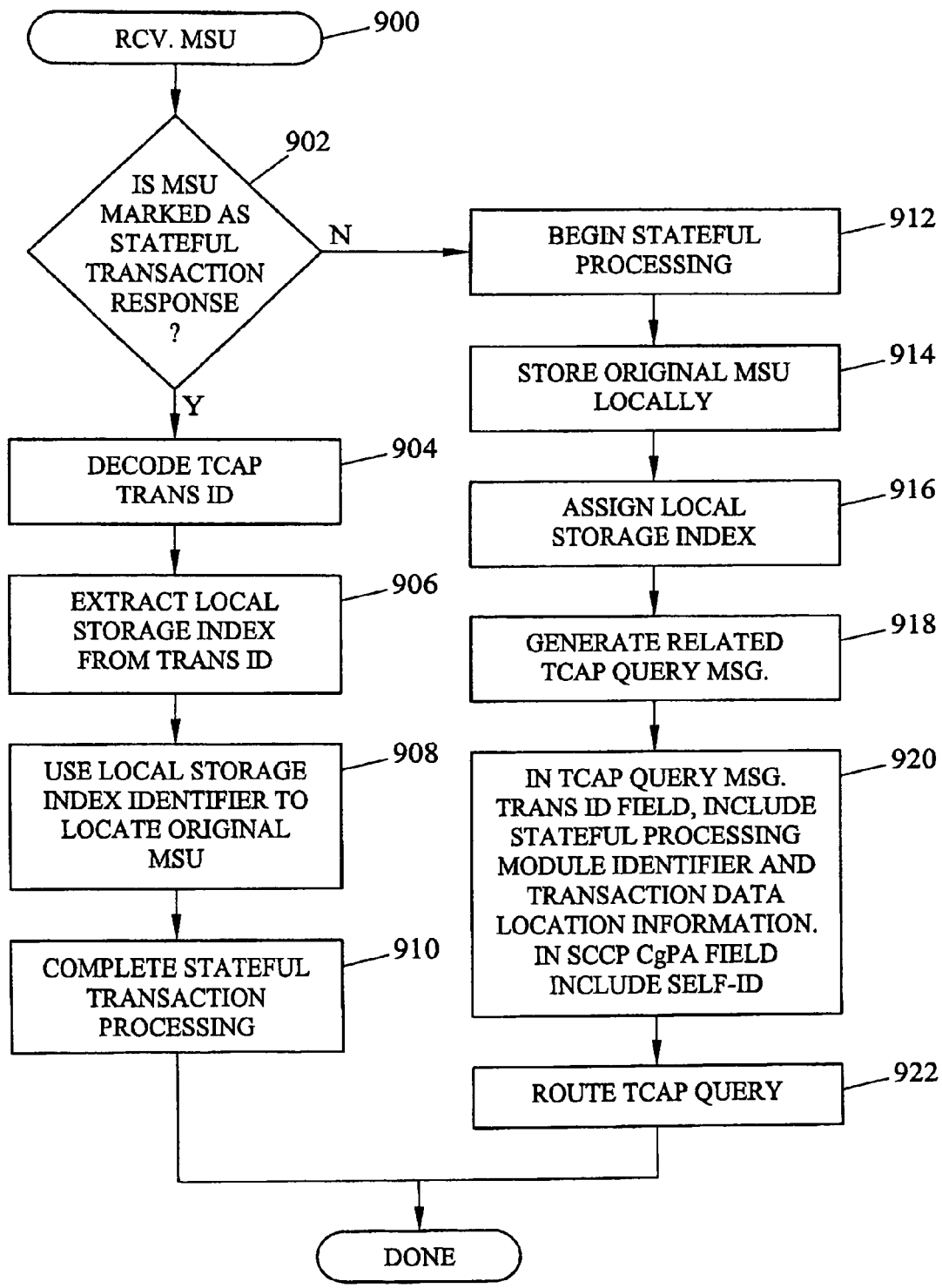
FIG. 9 is a flow chart illustrating exemplary steps that may be performed by a stateful processing module in implementing a stateful transaction in an STP for the embodiment described with regard to FIG. 6 in which stateful processing module identification is performed by a LIM.

Stateful Processing Module Process Flow for Stateful Transaction Query and Response Messages FIG. 9 is a flow chart illustrating exemplary stateful processing of a TCAP query and response messages by a stateful processing module where initial stateful transaction screening is performed by a LIM according to an embodiment of the present invention. Referring to FIG. 9, in step 900, an SS7 MSU is received at stateful processing module 314. An examination is next performed in step 902 to determine whether the message is marked or tagged as a stateful transaction response message. If it is determined that the message is a stateful transaction response message, then a TCAP transaction ID parameter is decoded (step 904). Stateful transaction data location information related to the stateful transaction associated with the response message is extracted from the TCAP ID parameter value (step 906) and is used to retrieve transaction information from storage buffer 716, as indicated in step 908.

Stateful transaction processing is then completed (step 910). Such stateful transaction processing may include generation of a new signaling message, modification of the signaling message that triggered the transaction, generation of a call detail record (CDR) or transaction detail record (TDR), etc. CDRs and TDRs may contain information associated with call setup events and non-call related signaling events, respectively. These records may be used for a number of purposes including network engineering, network monitoring, and network billing.

Returning to step 902, if it is determined that the received message is not a stateful transaction response message, a new transaction may be initiated, as indicated in step 912. The received message is treated as a stateful transaction triggering message and some or all of the message is stored in buffer 710 (step 914). An identifier associated with the storage location in buffer 710 is generated and included in a related TCAP query message, as indicated in steps 914 and 918. In one embodiment, an identifier associated with the stateful transaction processing module that received and processed the triggering message along with the storage location identifier information may be included in the transaction ID field of the TCAP query message (step 920). Also, a self-ID associated with STP node 300 is included in the SCCP calling party address field of the TCAP query message. The TCAP query message is then routed (step 922) to a database or service application (e.g., a number portability translation application, an authentication or registration application, a presence application, a calling name delivery application, etc.), which may be internal or external to STP 300.

Inter-network Gateway Implementation

In one embodiment, the stateful transaction processing steps described herein may be implemented in a gateway node capable of performing SS7 routing functions and IP telephony signaling functions, such as SIP signaling functions. For example, users of a SIP signaling network that require number portability (NP) service may direct a SIP signaling message to an SS7/SIP gateway node. The received SIP signaling message may be temporarily buffered and used to trigger a TCAP query to an SS7 NP database or SCP. When a TCAP NP response message is returned by the SCP, the TCAP response message is directed internally to the stateful processing module that received the SIP message and originated the TCAP NP query. The NP response information may be used, for example, to modify the original SIP message, route the original SIP message, and/or create a new SIP message.

Figure 10:
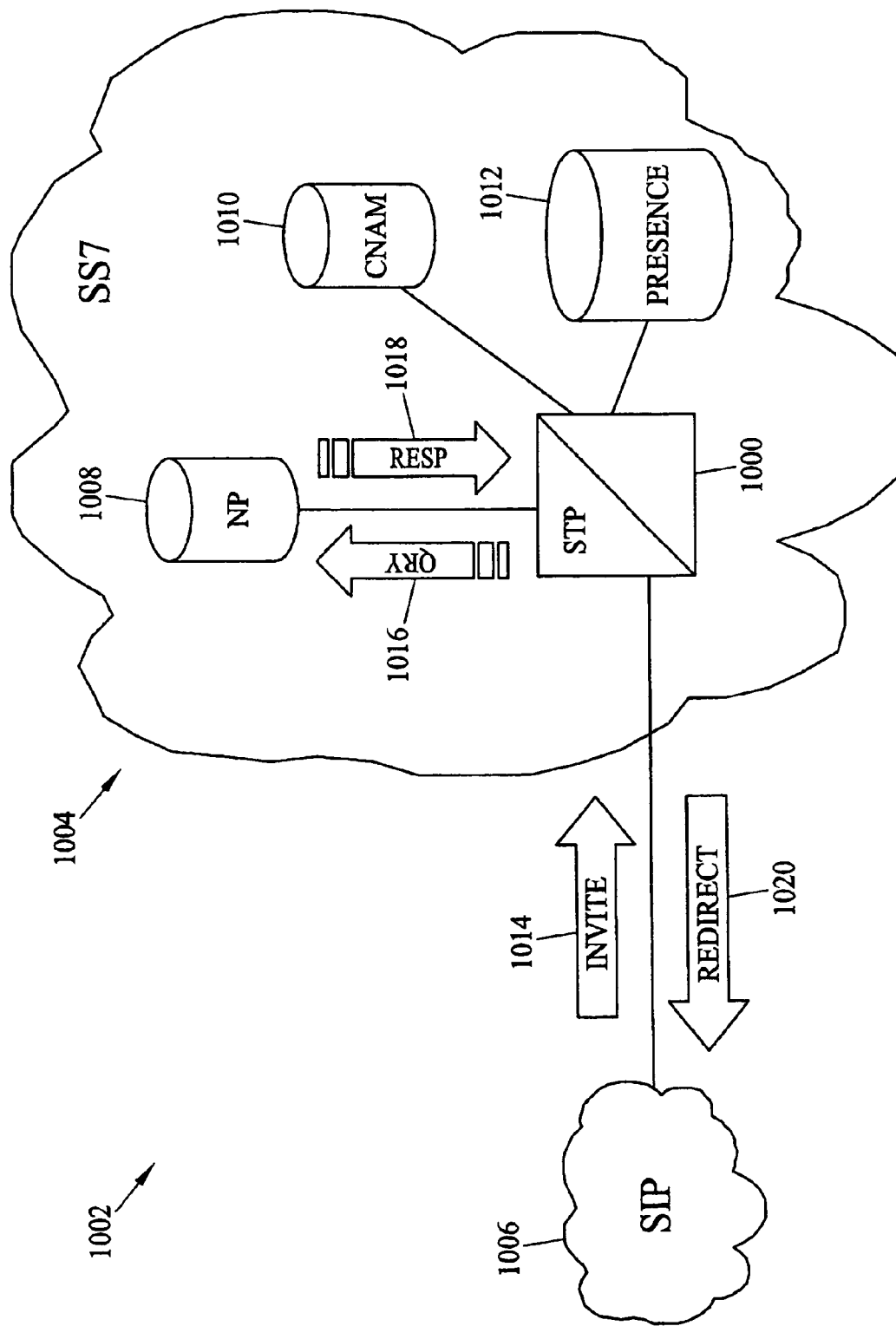
FIG. 10 is a network diagram illustrating an SS7/SIP gateway for performing stateful processing operations according to an embodiment of the present invention.

FIG. 10 is a network diagram illustrating an SS7 STP 1000 configured to perform stateful TCAP transactions in a manner similar to that described above. In addition, STP 1000 may be is configured to perform stateful transaction processing based on received IP telephony signaling messages. Referring to FIG. 10, STP 1000 is located in network environment 1002, which includes an SS7 network component 1004 and a SIP network component 1006. SS7 network component 1004 includes multiple application service platforms (e.g., service control points, application servers, etc.) that support a variety of network services including number portability services, calling name (CNAM) services, and presence services. In the illustrated example, number portability service is provided by node 1008, CNAM service is provided by node 1010, and presence service is provided by node 1012. Number portability services may include both intra- and inter-carrier number portability services. CNAM services may include services that identify the name of a calling or called party, while presence services may provide information related to the current status and/or communication preferences of a subscriber (e.g., availability, authorized calling party information, communication medium preferences, etc.).

In the signaling example illustrated in FIG. 10, a SIP Invite message 1014 is communicated from SIP network 1006 to STP 1000. STP 1000 receives SIP invite message 1014 and directs the message to a stateful processing module, in a manner similar to that described above. The SIP message is temporarily buffered, and, in this example, it is determined that number portability service is required. STP 1000 generates an SS7 TCAP number portability query message 1016 and transmits the message to NP node 1008. Node 1008 responds with response message 1018. Using the stateful message distribution technique described above, response message 1018 is returned to the same stateful processing module that received the original SIP Invite message 1014 and generated query message 1016. Number portability information supplied in response message 1018 along with information in the original SIP Invite message 1014 is used to generate a SIP Redirect message 1020. SIP Redirect message 1020 is returned to the SIP network 1006, where call setup operations are continued.

As illustrated in FIG. 10, the stateful transaction processing methods of the present invention may be used to allow users of a first network (e.g., a SIP network) to gain access to network services (e.g., number portability services, CNAM services, Presence services, etc.) residing in a second network (e.g., an SS7 network). Combining load sharing, stateful transaction processing, and signaling gateway functionality in an STP increases the reliability and throughput over conventional centralized processing architectures.

Stateful Processing-Module-Based Screening

In the example described above with regard to FIG. 6, initial screening of messages to determine whether the message requires stateful processing was performed on a LIM. However, the present invention is not limited to such an embodiment. In an alternate embodiment, each link interface module may load share messages to one of the stateful processing modules without regard to whether the message requires stateful processing. The stateful processing module that receives the message will decode the message and determine whether the message is a response associated with an STP-initiated stateful transaction and, if so, whether the message arrived at the correct processing module. If the message did not arrive at the correct processing module, the receiving stateful processing module may forward the message to the correct processing module.

Figure 11:
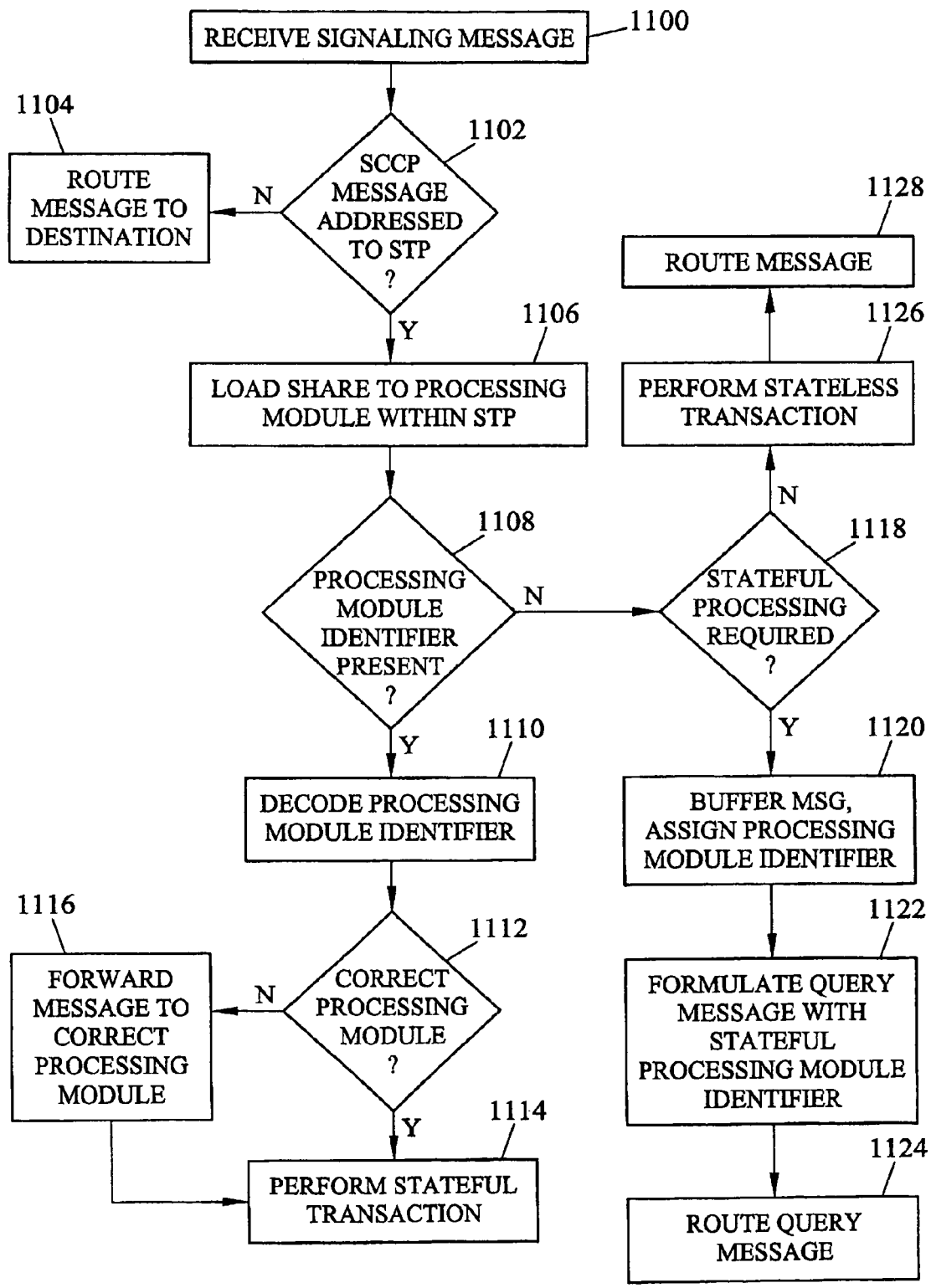
FIG. 11 is a flow chart illustrating exemplary steps for stateful transaction processing in an STP in which stateful processing module identification is performed by a stateful processing module.

FIG. 11 is a flow chart illustrating exemplary steps for integrating stateful processing and load sharing in an STP where stateful transaction screening is performed on the stateful processing modules, rather than on the LIMs. Such an STP may be similar in architecture to the STP illustrated in FIGS. 3, 4, and 7. However, stateful application screening function 408 illustrated in FIG. 4 may be located on each stateful processing module, rather than on each LIM. Referring to FIG. 11, in step 1100, the STP receives a signaling message. The signaling message may be received at one of the LIM cards or at a DCM card. In step 1102, the LIM card or DCM card determines whether the message is an SCCP message that is addressed to the STP. If the message is not an SCCP message addressed to the STP, control proceeds to step 1104 where the message is routed to its intended destination.

In step 1102, if the message is determined to be an SCCP message addressed to the STP, control proceeds to step 1106 where the message is load shared to a processing module within the STP. For example, the message may be load shared to one of stateful processing modules 308, 310, 312, 314, and 316 illustrated in FIG. 3. The load sharing may be performed without regard to whether the message requires stateful processing or whether the message is a response message. In step 1108, the receiving SCCP card determines whether a processing module identifier is present in the message. If a processing module identifier is determined to be present in the message, control proceeds to step 1110 where the processing module identifier is decoded. In step 1112, it is determined whether the receiving module is the correct processing module for the stateful transaction. If the receiving processing module is the correct module, control proceeds to step 1114 where the stateful transaction is performed. If the receiving processing module is not the correct module, control proceeds to step 1116 where the message is forwarded to the correct processing module.

Returning to step 1108, if a stateful processing module identifier is determined not to be present in the message, control proceeds to step 1118 where it is determined whether stateful processing is required. This step may be accomplished by decoding the TCAP or ISUP portion of the message to identify whether the message is a TCAP query or an ISUP message that triggers a stateful transaction. If stateful processing is required, control proceeds to step 1120 where the message is buffered and a processing module identifier is assigned to the transaction. In step 1122, the processing module formulates a query message and inserts the stateful processing module identifier in the query message. In step 1124, the stateful processing module routes the query message to its intended destination.

Returning to step 1118, if the message is determined not to require stateful processing, control proceeds to step 1126 where a stateless transaction is performed. An example of a stateless transaction that may be performed by a stateful processing module according to the present invention is global title translation. In step 1128, after the stateless transaction is performed, the message is routed to its destination.

Thus, the steps in FIG. 11 illustrate an example of how an STP can perform stateful message processing and load sharing with minimal decoding on the LIMs. One advantage of this method is that the processing load on the LIMs is not increased. However, a disadvantage of such a method is that if a stateful transaction response message arrives at the wrong stateful processing module, the message must be routed to the correct stateful processing module. Such double-hop routing can result in increased bandwidth consumption on the IMT backplane.

Centralized Distribution Module

In yet another alternate implementation of the invention, rather than performing stateful processing module identification at the link interface modules or the stateful processing modules, SCCP messages addressed to the STP may be forwarded to a distribution module in the STP that tracks the location of stateful transactions being performed by the STP. The distribution module may load share messages associated with stateless transactions and new stateful transactions to one of the stateful processing modules. For messages associated with existing stateful transactions, the distribution module may forward each messages to the appropriate stateful processing module based on the processing module identifier in each message.

Figure 12:
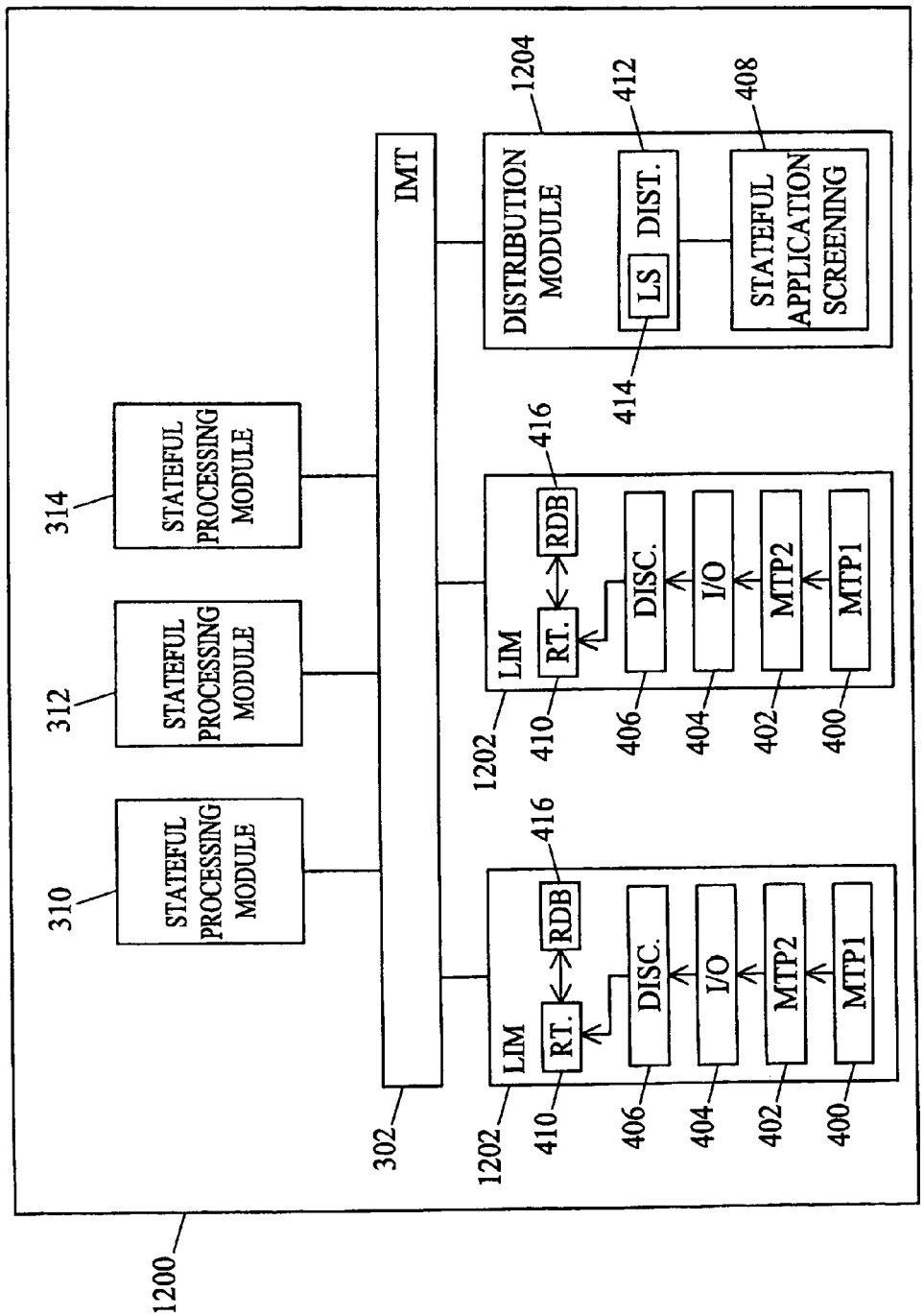
FIG. 12 is a block diagram illustrating an exemplary internal architecture for an STP in which stateful transaction processing module identification is performed by a centralized distribution module.

FIG. 12 is a block diagram of an STP including centralized distribution module according to an embodiment of the present invention. Referring to FIG. 12, STP 1200 includes stateful processing modules 310, 312, and 314 that perform stateless and stateful transactions as described above. In addition, STP 1200 includes link interface modules 1202 and a distribution module 1204. Link interface modules 1202 each include an MTP level 1 function 400, an MTP level 2 function 402, an I/O queue 404, a discrimination function 406, a routing function 410, and a routing database 416, that perform the same functions as described above with regard to FIG. 4. However, unlike the link interface module illustrated in FIG. 4, link interface modules 1202 do not include stateful application screening function 408, distribution function 412, or load sharing function 414. In the embodiment illustrated in FIG. 12, these functions have been moved to distribution module 1204.

In operation, in the embodiment illustrated in FIG. 12, when a signaling message is received by one of the link interface modules 1200 and 1202, the signaling message is passed up the MTP stack to discrimination function 406. Discrimination function 406 determines whether the signaling message is addressed to STP 1200 or to an external node. If the message is not addressed to the point code of STP 1200, discrimination function 406 forwards a signaling message to routing function 410, which routes the message to the link interface module associated with the appropriate outbound signaling link. In order to perform this function, routing function 410 may perform a lookup in routing database 416 based on a destination point code in the signaling message.

For messages addressed to STP 1200, the receiving link interface module may forward the messages to distribution module 1204. Distribution module 1204 may perform the steps illustrated in FIG. 6 for stateful application screening. That is, stateful application screening function 408, distribution function 412, and load sharing function 414 may distribute messages associated with existing stateful transactions to the appropriate stateful processing module using the stateful processing module identifiers present in the response messages. Modules 408, 412, and 414 may load share messages associated with new stateful transactions and stateless transactions to modules 310, 312, and 314.

Thus, in the embodiment illustrated in FIG. 12, load sharing and determining whether the appropriate processing module to which messages should be forwarded is performed by a centralized distribution module. One advantage of such a system is that the processing required to load share and distribute messages associated with stateful transactions is removed from the link interface modules and the stateful processing modules performing the transaction. One potential disadvantage to this solution is bandwidth consumption on bus 302 due to routing messages to and from distribution module 1204.

TCAP-Triggered Stateful Processing Example

Figure 13:
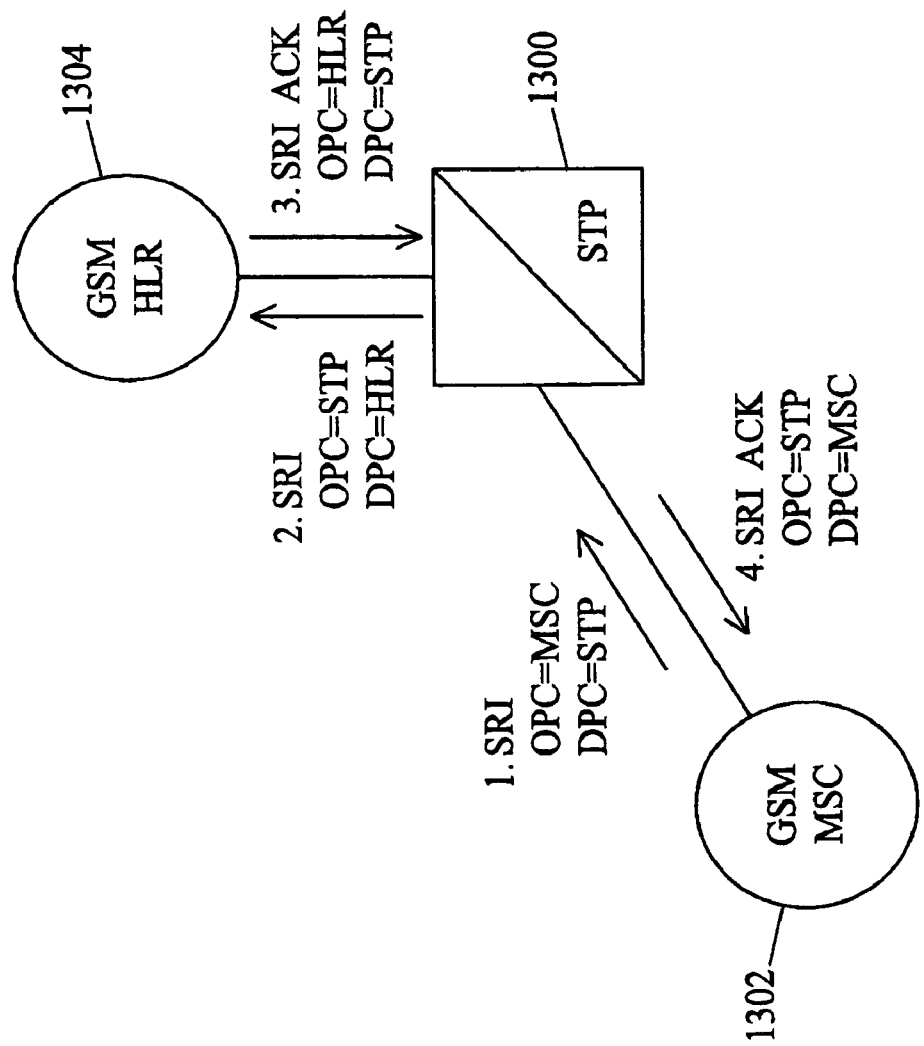
FIG. 13 is a network diagram illustrating an exemplary message flow for a stateful transaction triggered by a TCAP message received by an STP according to an embodiment of the present invention.

As stated above, stateful transactions may be initiated by signal transfer points in response to received SS7 messages, such as ISUP messages and TCAP messages, and received IP telephony messages, such as SIP messages. FIG. 13 is a network diagram illustrating an exemplary TCAP-triggered stateful transaction that may be performed by an STP. Referring to FIG. 13, a mobile communications network may include an STP 1300, a mobile switching center 1302, and an HLR 1304. STP 1300 may be configured to perform stateful transaction processing and load sharing as described above. MSC 1302 may perform mobile switching functions. In this example, MSC 1302 is a GSM MSC. HLR 1304 stores mobile subscriber subscription information for GSM subscribers.

In operation, when GSM MSC 1302 receives an IAM message relating to a call to a mobile subscriber, GSM MSC 1302 may formulate a send routing information (SRI) message and forward the message to STP 1300. In response to the SRI message, STP 1300 may extract the MSISDN number and perform a lookup in an internal HLR address database. STP 1300 may determine that the subscriber information corresponding to the particular SRI message is stored in GSM HLR 1304. Accordingly, STP 1300 may buffer the original SRI message and formulate a new SRI message to GSM HLR 1304. GSM HLR 1304 looks up the subscriber information and returns the information in an SRI ACK message. The SRI ACK message is addressed to STP 1300. STP 1300 may receive the SRI ACK message, distribute the messages to the appropriate stateful processing module using any of the methods described above, and formulate a new SRI ACK message addressed to MSC 1302.

Thus, in the example illustrated in FIG. 13, STP 1300 performs a stateful transaction in response to a received SRI message. An SRI message is a GSM MAP message that is carried in the TCAP part of a message. Accordingly, FIG. 13 illustrates an example of stateful processing by an STP in response to a received TCAP message.

ISUP-Triggered Stateful Processing Example

Figure 14:
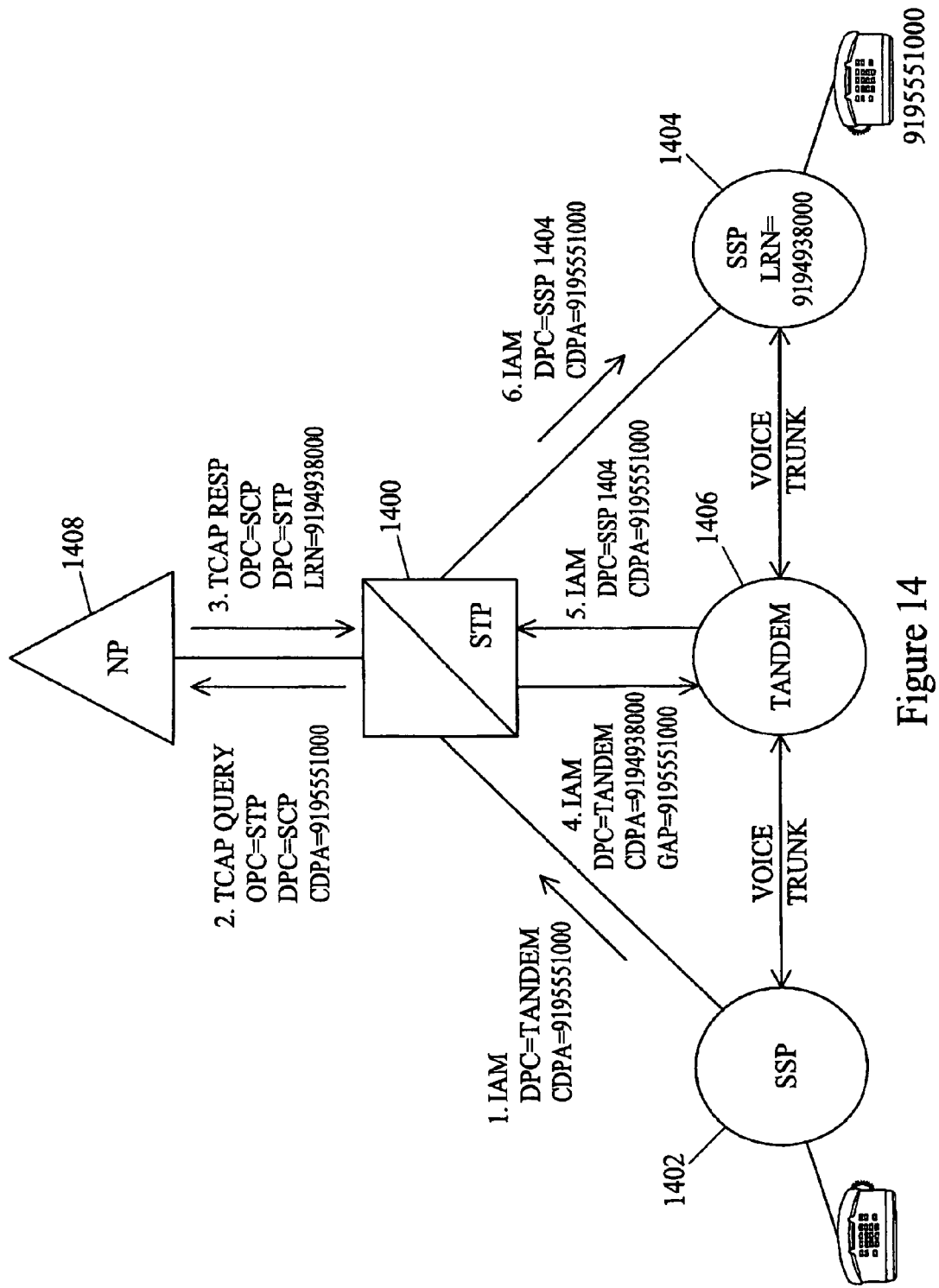
FIG. 14 is a network diagram illustrating an exemplary message flow for a stateful transaction triggered by an ISUP message received by an STP according to an embodiment of the present invention.

In another of the examples discussed above, an STP may perform a stateful transaction in response to a received ISUP message. FIG. 14 is a network diagram illustrating an exemplary stateful transaction that may be performed by an STP in response to a received ISUP message. Referring to FIG. 14, the illustrated SS7 network includes an STP 1400, SSPs 1402 and 1404, a tandem office 1406, and an SCP-based number portability database 1408.

In the illustrated example, a calling party attached to SSP 1402 dials a directory number associated with a subscriber whose number has been ported from one telecommunications service provider to another telecommunications service provider, represented by SSP 1404. SSP 1404 is assumed to be associated with a location routing number of 9194938000. In response to receiving the dialed digits, SSP 1402 sends an IAM message to tandem office 1406. In the IAM message, the called party address (CDPA) field is equal to 9195551000, which corresponds to the directory number of the called party. Upon receiving the IAM message, STP 1400 identifies the IAM message as being associated with a stateful transaction. Accordingly, STP 1400 may encapsulate the IAM message in an SCCP packet addressed to STP 1400. Once the packet encapsulated, stateful transaction processing may be initiated as described above.

In order to initiate such processing, the encapsulated IAM message is load shared to one of the stateful processing modules. The receiving stateful processing module formulates a TCAP query, inserts its stateful processing module identified in the query, and sends the query to number portability SCP 1408. SCP 1408 performs a lookup in its database using the called party address value supplied in the TCAP query and returns a response to STP 1400. The response includes an LRN value corresponding to end office 1404 and the stateful processing module identifier. When STP 1400 receives the response, STP 1400 pairs the response with the stateful processing module that initiated the query using the stateful processing module identifier.

STP 1400 may then insert the returned LRN value in a new IAM message and move the original called party address value to the GAP parameter in the IAM message. The new IAM message may then be forwarded to tandem office 1406. Upon receiving the IAM message, tandem office 1406 reserves a voice trunk with SSP 1402 and performs a lookup in its LRN database. Tandem office 1406 determines that the LRN value in the IAM message is associated with SSP 1404. Accordingly, tandem office 1406 formulates a new IAM message and forwards the new IAM message to SSP 1404.

STP 1400 routes the new IAM message to SSP 1404 without triggering stateful processing. Upon receiving the new IAM message, SSP 1404 reserves a voice trunk for the call with tandem office 1406.

As illustrated in FIG. 14, stateful processing may be triggered by a received IAM message. The IAM message may trigger a TCAP transaction. The TCAP query is originated by one of a plurality of stateful processing modules assigned to the transaction using a load sharing algorithm. The TCAP response is automatically routed back to the correct stateful processing module using the stateful processing module identifier included in the response message.

Figure 15:
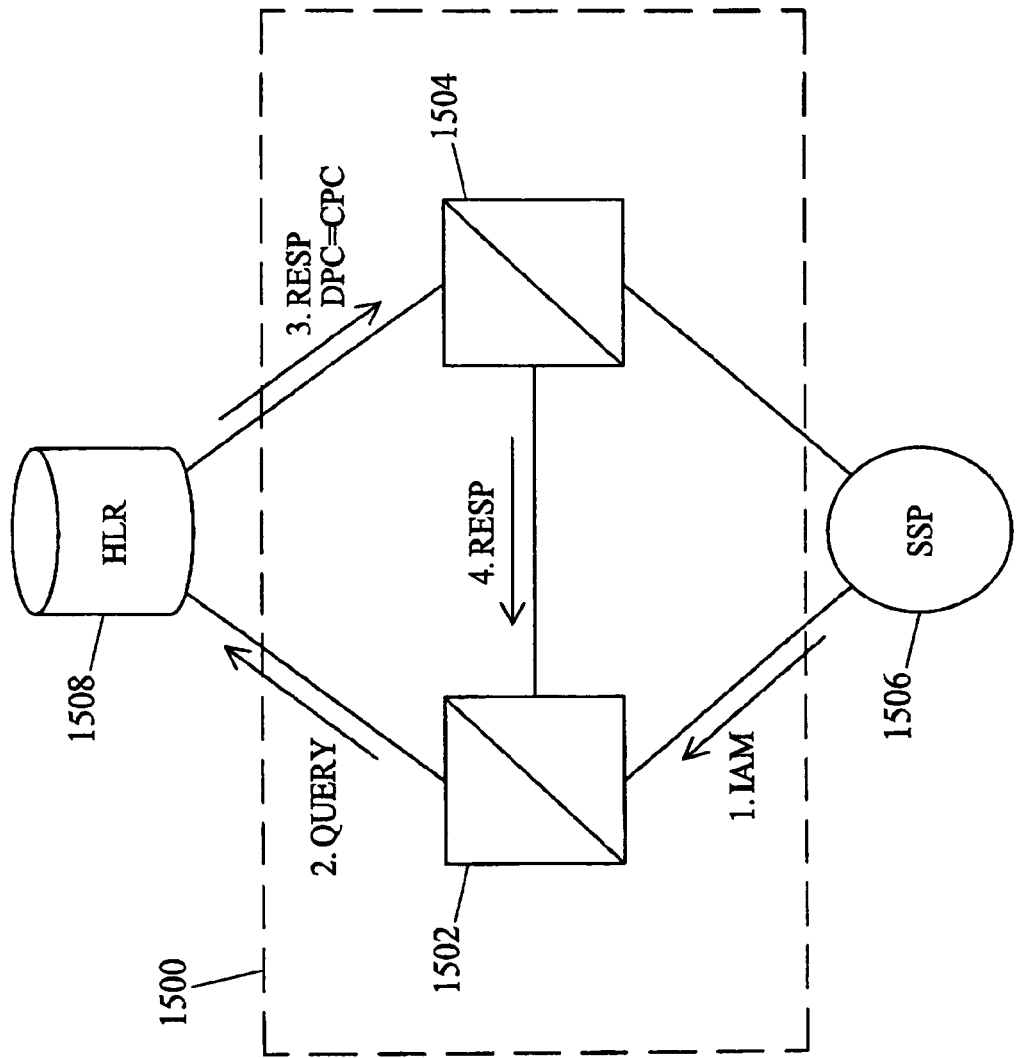
FIG. 15 is a network diagram illustrating an exemplary message flow for a stateful transaction triggered by an ISUP message in which the response to the stateful transaction query message is sent to a capability point code of an STP pair that implements stateful transaction processing according to an embodiment of the present invention.

The methods and systems for implementing stateful transactions at an STP may be used to distribute stateful transaction response messages to the appropriate stateful processing module, even when the stateful transaction response message is received by an STP in a mated pair of STPs that did not originate the stateful transaction query message. FIG. 15 is a network diagram illustrating exemplary stateful transaction processing by a mated pair of STPs according to an embodiment of the present invention. Referring to FIG. 15, a mated pair of STPs 1500 includes a first STP 1502 and a second STP 1504. STPs 1502 and 1504 may share a capability point code which other nodes may use in routing messages to STP pair 1500. In this example, STPs 1502 and 1504 may include stateful transaction processing architectures similar to any of the architectures described above.

When an SSP 1506 formulates an IAM message and forwards the IAM message to a destination SSP, the IAM message may be sent to STP 1502. In response to the IAM message, STP 1502 determines that stateful transaction processing is required and initially selects a stateful processing module to perform a stateful transaction using a load sharing algorithm, as described above. The stateful processing module in STP 1502 assigned to the transaction formulates a stateful transaction query message and forwards the query message to HLR 1508. In the query message, the stateful processing module inserts its module identifier. In addition, the stateful processing module may insert an entity address corresponding to STP 1502 in the SCCP calling party address field.

When HLR 1508 receives the query message, HLR 1508 formulates a response message. In this example, it is assumed that the response message is addressed to the capability point code of STP pair 1500. The SCCP called party address in the response message may be set to the entity address of STP 1502. The stateful processing module identifier may be inserted in the TCAP transaction identifier field. HLR 1508 forwards the response message to STP 1504.

In response to receiving the response message, STP 1504 examines the entity address stored in the SCCP called party address and determines that the response message is addressed to STP 1502. Accordingly, STP 1504 forwards the response message to STP 1502. STP 1502 receives the response message, identifies the response message as being associated with an existing stateful transaction, and uses the stateful transaction identifier to distribute the response message to the appropriate internal processing module. Thus, using the steps illustrated in FIG. 15, stateful transactions can be implemented by a mated pair of STPs, even when response messages are forwarded to the wrong processing module.

CONCLUSIONS

Thus, the present invention includes methods and systems for performing stateful transactions in an STP having a distributed processing architecture and having a load sharing algorithm. In response to receiving a message that triggers a stateful transaction, a signal transfer point of the present invention distributes the message to one of a plurality of stateful processing modules using a load sharing algorithm. The stateful processing module that controls the transaction formulates a query message for the stateful transaction. In the query message, the stateful transaction processing module inserts its identifier. The stateful transaction processing module routes the query to its intended destination. The node that responds to the query includes the stateful transaction processing module identifier in the response. The STP receives the response and uses the identifier to forward the response to the controlling stateful processing module.

Although the present invention has been described above using stateful TCAP transactions as examples, the present invention is not limited to performing stateful TCAP transactions. The methods and systems for initiating stateful transactions and for distributing stateful transaction trigger and response messages may be applied to any suitable stateful transaction that includes generating a query and receiving a response. For example, in an alternate implementation, the present invention may include generating an IP-based query to a database in an IP network and receiving a response from the IP database.

In the examples described above, the stateful transactions involve generation of a single stateful transaction query message in response to a stateful transaction trigger message. However, the present invention is not limited to formulating a single stateful transaction query message in response to a stateful transaction trigger message. For example, it may be desirable to generate more than one stateful transaction query message in response to a stateful transaction trigger message. One instance in which this may be desirable is in mobile communications networks with dual mode handsets. In such networks, it may be desirable to send a GSM send routing information query and IS-41 location request query in response to a received ISUP message relating to a call to a dual mode subscriber. In such a situation, the responses to the SRI and location request query messages would be routed back to the appropriate processor using the processing module identifier as described above.

The present invention is likewise not limited to receiving a single response to a query message. In some instances, responses may be segmented over several messages. Such segmented responses may be delivered to the appropriate stateful processing module assigned to a transaction using the stateful processing module identifier as described above.

Because the present invention includes inserting stateful transaction processing module identification information in stateful transaction query messages in a manner such that a receiving node will insert that identifier in a response message, stateful transaction processing can be distributed among multiple processors, while ensuring that subsequent messages in each stateful transaction are distributed to the controlling processor. In addition, because the present invention triggers stateful transaction processing at an STP, the need for end office triggers is reduced. Finally, the stateful transaction processing of the present invention integrates with load sharing algorithms.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for performing stateful signaling transactions in a distributed processing environment, the method comprising:
    (a) receiving a first signaling message;
    (b) forwarding the first signaling message to a first stateful processing module of a plurality of stateful processing modules located in the same node;
    (c) at the first stateful processing module:
        (i) generating a stateful transaction query message based on the first signaling message;
        (ii) inserting an identifier in the stateful transaction query message for identifying the first stateful processing module; and
        (iii) forwarding the stateful transaction query message to a destination; and
    (d) receiving a response to the stateful transaction query message, the response including the identifier; and
    (e) using the identifier to distribute the response to the first stateful processing module that originated the stateful transaction query message from among the plurality f stateful processing modules located in the same node; and wherein steps (a)-(e) are performed at a signal transfer point (STP).

2. The method of claim 1 wherein receiving a first signaling message includes receiving a first transaction capabilities application part (TCAP) query message and wherein the method further comprises buffering the first TCAP query message at the first stateful processing module.

3. The method of claim 2 wherein formulating a stateful transaction query message includes formulating a second TCAP query message based on the first TCAP query message.

4. The method of claim 1 wherein receiving a first signaling message includes receiving an ISDN user part (ISUP) message and wherein the method further comprises buffering ISUP message at the first stateful processing module.

5. The method of claim 4 wherein formulating a stateful transaction query message includes formulating a transaction capabilities application part (TCAP) query message based on the ISUP message.

6. The method of claim 1 wherein receiving a first signaling message includes receiving an IP telephony signaling message and wherein the method further comprises buffering the IP telephony signaling message at the first stateful processing module.

7. The method of claim 6 wherein formulating a stateful transaction query message includes formulating a transaction capabilities application part (TCAP) query message based on the received IP telephony signaling message.

8. The method of claim 1 wherein forwarding the first signaling message to a first stateful processing module of a plurality of stateful processing modules includes selecting the first stateful processing module from the plurality of stateful processing modules using a load sharing algorithm.

9. The method of claim 1 where inserting an identifier in the stateful transaction query message includes placing the identifier in a field in the stateful transaction query message for causing the destination to insert the identifier in the response.

10. The method of claim 9 wherein the stateful transaction query message comprises a transaction capabilities application part (TCAP) message and the field comprises a transaction identifier field in the TCAP message.

11. The method of claim 1 wherein receiving a response to the stateful transaction query message includes receiving the response at a link interface module and wherein using the identifier to distribute the response to the first stateful processing module includes decoding the identifier at the link interface module and sending the response to the stateful processing module corresponding to the identifier.

12. The method of claim 1 wherein receiving a response to the stateful transaction query message includes receiving the response at a link interface module and wherein using the identifier to distribute the response to the first stateful processing module includes forwarding the response to a second stateful processing module using a load sharing algorithm and, at the second stateful processing module, decoding the identifier and forwarding the stateful transaction query message to the first stateful processing module.

13. The method of claim 1 wherein receiving a response to the stateful transaction query message includes receiving the response at a link interface module and wherein using the identifier to distribute the response to the first stateful processing module includes forwarding the response to a distribution module, and, at the distribution module, decoding the identifier and forwarding the stateful transaction query message to the first stateful processing module.

14. The method of claim 1 comprising formulating a transaction detail record (TDR) based on the stateful transaction.

15. The method of claim 1 wherein the stateful transaction query message and the response comprise IP-based messages.

16. The method of claim 1 wherein generating a stateful transaction query message includes generating a plurality of stateful transaction query messages, wherein receiving a response includes receiving a response to each query message, and wherein using the identifier to distribute the response includes using the identifier to distribute the response to each query message.

17. The method of claim 1 wherein receiving a response to the stateful transaction query message includes receiving multiple responses to the stateful transaction query message, each response including the identifier, and wherein using the identifier to distribute the response to the first stateful processing module includes using the identifier to distribute each response to the first stateful processing module.

18. The method of claim 1 wherein forwarding the stateful transaction query message to a destination includes inserting an entity address of a first signal transfer point of a mated pair of signal transfer points in the stateful transaction query message, forwarding the stateful transaction query message from the first signal transfer point to the destination and wherein receiving the response includes receiving the response at a second signal transfer point of the mated pair of signal transfer points, decoding the response and extracting an entity address from the response, determining that the entity address corresponds to the first signal transfer point, and forwarding the response to the first signal transfer point.

19. A method for performing stateful signaling transactions in a distributed processing environment, the method comprising:
 (a) receiving a first signaling message;
 (b) forwarding the first signaling message to a first stateful processing module of a plurality of stateful processing modules;
 (c) at the first stateful; processing module:
  (i) generating a stateful transaction query message based on the first signaling message;
  (ii) inserting an identifierin the stateful transaction query message for identifying the first stateful processing module; and
  (iii) forwarding the stateful transaction query message to a destination; and
 (d) receiving a response to the stateful transaction query message, the response including the identifier;
 (e) using the identifier to distribute the response to the first stateful processing module;
 (f) inserting stateful transaction location information in the stateful transaction query message;
 (g) extracting the stateful transaction location information from the response; and
 (h) using the stateful transaction location information to locate data associated with the stateful transaction; and wherein steps (a)-(h) are performed at a signal transfer point (STP).

20. A telecommunications network element comprising:
 (a) a link interface module for receiving signaling messages and for forwarding predetermined signaling messages to one of a plurality of stateful processing modules located in the same node using a load sharing algorithm; and
 (b) each of the stateful processing modules being configured to identify signaling messages received from the link interface module as stateful transaction trigger messages or stateful transaction response messages, and, in response to receiving transaction trigger message, each of the stateful processing modules being configured to formulate a stateful transaction query message and to insert a stateful processing module identifier in the query message for distribution of a response to a stateful transaction query message to the stateful processing module that originated the stateful transaction query message from among the plurality of stateful processing modules located in the same node; and wherein the link interface module and the stateful processing modules are components of a signal transfer point (STP).

21. The telecommunications network element of claim 20 wherein the link interface module comprises an SS7 link interface module for sending and receiving SS7 messages and for forwarding signaling connection control part (SCCP) messages to the stateful processing modules.

22. The telecommunications network element of claim 20 wherein the link interface module comprises an IP telephony link interface module for sending and receiving IP telephony signaling messages and for forwarding predetermined IP telephony signaling messages to the stateful processing modules.

23. The telecommunications network element of claim 20 wherein the link interface module is configured to forward a first signaling message to a first stateful processing module using a load sharing algorithm and wherein the first stateful processing module is configured to forward the first signaling message to a second stateful processing module in response to determining that the first signaling message is associated with a stateful transaction initiated by the second stateful processing module.

24. The telecommunications network element of claim 20 wherein each stateful processing module is configured to formulate stateful transaction query messages in response to received transaction capabilities application part (TCAP) messages.

25. The telecommunications network element of claim 20 wherein each stateful processing module is configured to formulate stateful transaction query messages in response to received ISDN user part (ISUP) messages.

26. The telecommunications network element of claim 20 wherein each stateful processing module is configured to formulate stateful transaction query messages in response to received IP telephony signaling messages.

27. The telecommunications network element of claim 20 wherein each stateful processing module is configured to place its stateful processing module identifier in a field in the stateful transaction query message that will cause a destination for the stateful transaction query message to insert the stateful processing module identifier in a response to the query message.

28. The telecommunications network element of claim 27 wherein the stateful transaction query message comprises a transaction capabilities application part (TCAP) message and the field comprises a transaction identifier field.

29. The telecommunications network element of claim 20 comprising a centralized distribution module for distributing stateful transaction query and response messages to the stateful processing modules, wherein the link interface module is configured to forward received signaling messages to the distribution module.

30. The telecommunications network element of claim 20 wherein each stateful processing module is configured to formulate transaction detail records for stateful transactions that it originates.

31. A telecommunications network element comprising:
 (a) a link interface module for receiving signaling messages and for forwarding predetermined signaling messages to one of a plurality of stateful processing modules using a load sharing algorithm; and (b) a plurality of stateful processing modules, each stateful processing module being configured to identify signaling messages received from the link interface module as stateful transaction trigger messages or stateful transaction responde messages, and, in response to receiving a stateful transaction trigger message, each stateful processing module is configured to formulate a stateful transaction query message and to insert a stateful processing module identifier in the query message, wherein the stateful processing modules are each configured to insert stateful transaction data location information in stateful transaction query messages, to extract the stateful transaction data location information from received stateful transaction response messages, and to use the stateful transaction data location information extracted from the response messages to locate data associated with each stateful transaction; and wherein the link interface module and the stateful processing modules are components of a signal transfer point (STP).

32. A computer program product comprising computer executable instructions embodied in a computer readable medium for performing steps comprising:
(a) receiving a signaling message;
(b) derermining whether the signaling message comprises a stateful transaction trigger message;
(c) in response to determining that the signaling message comprises a stateful transaction trigger message, formulating a stateful transaction query message based on the stateful transaction trigger message;
(d) inserting a stateful processing module identifier in the stateful transaction query message, the stateful processing module identifier identifying a stateful processing module that originates the stateful transaction query message from among a plurality of stateful processing modules located in the same node; and
(c) sending the stateful transaction query message to a predetermined destination; and wherein steps (a)-(e) are performed at a single transfer point (STP).

33. The computer program product of claim 32 wherein receiving a signaling message comprises receiving an ISDN user part (ISUP) signaling message and wherein formulating a stateful transaction query message includes buffering the ISUP message and formulating a transaction capabilities application part (TCAP) message based on the ISUP message.

34. The computer program product of claim 32 wherein receiving a signaling message includes receiving a first transaction capabilities application part (TCAP) message and wherein formulating a stateful transaction query message includes buffering the first TCAP message and formulating a second TCAP message based on the first TCAP message.

35. The computer program product of claim 32 wherein receiving a signaling message includes receiving an IP telephony signaling message and wherein formulating a stateful transaction query message includes formulating a transaction capabilities application part (TCAP) message based on the IP telephony signaling message.

36. The computer program product of claim 32 wherein inserting a stateful processing module identifier in the stateful transaction query message includes inserting the stateful processing module identifier in a field in the query message that causes a recipient of the query message to insert the stateful processing module identifier in a response to the query message.

37. The computer program product of claim 36 wherein the stateful transaction query message comprises a transaction capabilities application part (TCAP) query message and the field comprises a transaction identifier field in the TCAP query message.

38. The computer program product of claim 32 comprising receiving a response to the stateful transaction query message, the response including the stateful processing module identifier, and using the stateful processing module identifier to distribute the response to the stateful processing module that originated the stateful transaction query message.

* * * * *

UNITED STATES PATENT AND TRADEMARK OFFICE
CERTIFICATE OF CORRECTION

PATENT NO. : 7,554,974 B2  Page 1 of 1
APPLICATION NO. : 10/796653
DATED : June 30, 2009
INVENTOR(S) : Jonathan James Palmer et al.

It is certified that error appears in the above-identified patent and that said Letters Patent is hereby corrected as shown below:

Col. 17, line 64
  replace "f"
  with --of--.

Col. 19, line 40
  replace "identifierin"
  with --identifier in--.

Signed and Sealed this

Eighteenth Day of August, 2009

David J. Kappos
*Director of the United States Patent and Trademark Office*